US012773993B2

(12) United States Patent
Kamatani et al.

(10) Patent No.: US 12,773,993 B2
(45) Date of Patent: *Oct. 27, 2026

(54) VEHICLE DRIVING ASSISTANCE SYSTEM FOR CONTROLLING VEHICLE ACCELERATION

(71) Applicant: TOYOTA JIDOSHA KABUSHIKI KAISHA, Toyota (JP)

(72) Inventors: Hideki Kamatani, Nagoya (JP); Hideaki Ishihara, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 20 days.

This patent is subject to a terminal disclaimer.

(21) Appl. No.: 18/803,009

(22) Filed: Aug. 13, 2024

(65) Prior Publication Data

US 2024/0400051 A1 Dec. 5, 2024

Related U.S. Application Data

(63) Continuation of application No. 17/547,841, filed on Dec. 10, 2021, now Pat. No. 12,091,007.

(30) Foreign Application Priority Data

Dec. 16, 2020 (JP) ................................ 2020-208584

(51) Int. Cl.
*B60W 30/16* (2020.01)
*B60W 30/14* (2006.01)

(52) U.S. Cl.
CPC .......... *B60W 30/16* (2013.01); *B60W 30/146* (2013.01); *B60W 2554/4041* (2020.02); *B60W 2554/802* (2020.02); *B60W 2720/106* (2013.01)

(58) Field of Classification Search
CPC ............... B60W 30/16; B60W 30/146; B60W 2554/4041; B60W 2554/802;
(Continued)

(56) References Cited

U.S. PATENT DOCUMENTS

2006/0015240 A1* 1/2006 Shima ................ B60K 31/0008 701/93
2010/0070151 A1* 3/2010 Sonoda ..................... B60T 7/22 701/96
(Continued)

FOREIGN PATENT DOCUMENTS

JP 62-61832 A 3/1987
JP 2010126087 A 6/2010
(Continued)

OTHER PUBLICATIONS

US Office Action dated Dec. 31, 2025, issued in U.S. Appl. No. 18/803,008.
(Continued)

*Primary Examiner* — Aniss Chad
*Assistant Examiner* — Nikki Marie M Molina
(74) *Attorney, Agent, or Firm* — Sughrue Mion, PLLC

(57) ABSTRACT

A vehicle driving assistance system performs traveling assistance control under which an own vehicle automatically travels with. The traveling assistance control includes first constant-speed control for automatically controlling the acceleration of the own vehicle, based on a first vehicle-speed range including a set vehicle speed, such that the vehicle speed of the own vehicle is kept equal to the set vehicle speed, and second constant-speed control for automatically controlling the acceleration of the own vehicle, based on a second vehicle-speed range including the set vehicle speed, such that the vehicle speed of the own vehicle is kept equal to the set vehicle speed. The second vehicle-
(Continued)

speed range is set to a wider range than the first vehicle-speed range. The vehicle driving assistance system switches the traveling assistance control between the first constant-speed control and the second constant-speed control, according to the traveling state of the own vehicle.

9 Claims, 11 Drawing Sheets

(58) Field of Classification Search
CPC ......... B60W 2720/106; B60W 30/143; B60W 40/02; B60W 40/10; B60W 40/105
See application file for complete search history.

(56) References Cited

U.S. PATENT DOCUMENTS

| | | | | |
|---|---|---|---|---|
| 2014/0012478 | A1 | 1/2014 | Schulz et al. | |
| 2014/0371974 | A1 | 12/2014 | Huelsebusch et al. | |
| 2015/0367833 | A1 | 12/2015 | Maeda | |
| 2019/0092327 | A1 | 3/2019 | Osaki et al. | |
| 2019/0100209 | A1* | 4/2019 | Plianos | B60K 31/00 |
| 2019/0217861 | A1 | 7/2019 | Kurahashi | |
| 2019/0362633 | A1* | 11/2019 | Kiryu | B60W 30/18163 |
| 2020/0180620 | A1* | 6/2020 | Okuda | G08G 1/09 |
| 2021/0362713 | A1 | 11/2021 | Fujimaki et al. | |
| 2022/0185280 | A1 | 6/2022 | Kamatani | |

FOREIGN PATENT DOCUMENTS

| | | | |
|---|---|---|---|
| JP | 2013-82274 | A | 5/2013 |
| JP | 2013-86755 | A | 5/2013 |
| JP | 2013103662 | A | 5/2013 |
| JP | 2015-182629 | A | 10/2015 |
| JP | 2017-024586 | A | 2/2017 |
| JP | 2017-56765 | A | 3/2017 |
| JP | 2018113757 | A | 7/2018 |
| JP | 2019-123385 | A | 7/2019 |
| JP | 6611085 | B2 | 11/2019 |
| WO | 2014/122761 | A1 | 8/2014 |

OTHER PUBLICATIONS

Office Action dated Jun. 4, 2026, issued in U.S. Appl. No. 18/803,008.

Non-Final Office Action mailed Mar. 29, 2023 issued by the U.S. Patent and Trademark Office in U.S. Appl. No. 17/547,841.

Final Office Action mailed Sep. 7, 2023 issued by the U.S. Patent and Trademark Office in U.S. Appl. No. 17/547,841.

Non-Final Office Action mailed Jan. 4, 2024 issued by the U.S. Patent and Trademark Office in U.S. Appl. No. 17/547,841.

Notice of Allowance and Fees Due mailed May 15, 2024 issued by the U.S. Patent and Trademark Office in U.S. Appl. No. 17/547,841.

Office Action issued to U.S. Appl. No. 18/803,008 on Aug. 5, 2026.

* cited by examiner

VEHICLE DRIVING ASSISTANCE SYSTEM FOR CONTROLLING VEHICLE ACCELERATION

CROSS-REFERENCE TO RELATED APPLICATION

This application is a continuation of U.S. application Ser. No. 17/547,841, filed Dec. 10, 2021 (allowed), which claims priority to Japanese Patent Application No. 2020-208584 filed on Dec. 16, 2020, incorporated herein by reference in its entirety.

BACKGROUND

1. Technical Field

The present disclosure relates to a vehicle driving assistance system.

2. Description of Related Art

One type of vehicle is known which includes an internal combustion engine and a motor, as a drive unit that generates driving force (vehicle driving force) applied to the vehicle. This type of vehicle can be placed in a selected one of an HV mode in which the vehicle driving force is generated from both the internal combustion engine and the motor, and an EV mode in which the vehicle driving force is generated solely from the motor. A vehicle described in Japanese Unexamined Patent Application Publication No. 2015-182629 (JP 2015-182629 A) is configured to determine which of the HV mode and the EV mode is selected, so that the energy efficiency of the driven unit at the time when it generates the vehicle driving force becomes as high as possible.

SUMMARY

Another type of vehicle is known which is configured to be able to perform constant-speed control for automatically controlling the acceleration of the vehicle so that the vehicle speed of the vehicle is controlled to a vehicle speed (set vehicle speed) set by the driver. When the constant-speed control is performed, too, it is desirable to control the acceleration of the vehicle so that the energy efficiency of the drive unit at the time when the vehicle driving force is generated becomes as high as possible.

The present disclosure provides a vehicle driving assistance system that can perform constant-speed control for controlling the vehicle speed to the set vehicle speed, with the highest possible energy efficiency.

A vehicle driving assistance system according to one aspect of the present disclosure includes a controller that performs traveling assistance control for automatically controlling an acceleration of an own vehicle to cause the own vehicle to travel automatically. The traveling assistance control includes first constant-speed control under which the acceleration of the own vehicle is automatically controlled, based on a first vehicle-speed range including a set vehicle speed, such that a vehicle speed of the own vehicle is kept substantially equal to the set vehicle speed, and second constant-speed control under which the acceleration of the own vehicle is automatically controlled, based on a second vehicle-speed range including the set vehicle speed, such that the vehicle speed of the own vehicle is kept substantially equal to the set vehicle speed. Also, the second vehicle-speed range is set to a range that is wider than the first vehicle-speed range. The controller is configured to switch the traveling assistance control between the first constant-speed control and the second constant-speed control, according to a traveling state of the own vehicle.

Generally, when the vehicle speed is controlled to a particular vehicle speed, the degree of freedom with which operation of the drive unit is controlled so as to generate driving force (vehicle driving force) applied to the vehicle increases as the vehicle speed is controlled while being allowed to vary within the wider range. As a result, the control that makes the energy efficiency higher can be selected as the control performed on the drive unit. According to the above aspect of the present disclosure, the first constant-speed control based on the first vehicle-speed range having the narrower range of allowable vehicle-speed variations, and the second constant-speed control based on the second vehicle-speed range having the wider range of allowable vehicle-speed variations, are prepared as traveling assistance control modes, and the second constant-speed control is executed according to the traveling state of the own vehicle. It is thus possible to cause the own vehicle to travel, while controlling the vehicle speed of the own vehicle to the set vehicle speed with the higher energy efficiency.

The vehicle driving assistance system according to the above aspect of the present disclosure may further include a detection unit configured to detect a forward vehicle that travels on the same lane as the own vehicle, within a predetermined forward vehicle determination distance ahead of the own vehicle, and a following vehicle that travels on the same lane as the own vehicle, within a predetermined following vehicle determination distance behind the own vehicle. The controller may be configured to perform the first constant-speed control, when the forward vehicle and the following vehicle do not exist, and execution of the second constant-speed control is not requested. The controller may be configured to perform the second constant-speed control, when the forward vehicle and the following vehicle do not exist, and execution of the second constant-speed control is requested.

When there is no forward vehicle and no following vehicle, a situation where the distance between the own vehicle and a forward vehicle or the distance between the own vehicle and a following vehicle becomes extremely short does not take place, even when the vehicle speed of the own vehicle is controlled while being allowed to vary within a relatively large vehicle-speed range. With the above configuration, the second constant-speed control is performed, in the case where execution of the second constant-speed control is requested when there is no forward vehicle and no following vehicle. Thus, the second traveling control can be performed, without incurring the situation where the distance between the own vehicle and a forward vehicle or the distance between the own vehicle and a following vehicle becomes extremely short.

In the vehicle driving assistance system as described above, the second constant-speed control may include deceleration control for reducing the vehicle speed of the own vehicle, and acceleration control for increasing the vehicle speed of the own vehicle. During execution of the second constant-speed control, the controller may be configured to perform the deceleration control when the vehicle speed of the own vehicle increases, and reaches an upper limit of the second vehicle-speed range, and may be configured to perform the acceleration control when the vehicle speed of the own vehicle decreases, and reaches a lower limit of the second vehicle-speed range.

With the above configuration, when the vehicle speed of the own vehicle increases, and reaches the upper limit of the second vehicle-speed range, the deceleration control is executed, and the vehicle speed of the own vehicle is reduced. When the vehicle speed of the own vehicle reaches the lower limit of the second vehicle-speed range, the acceleration control is executed, and the vehicle speed of the own vehicle is increased. Thus, at least the average vehicle speed of the own vehicle is controlled to around the set vehicle speed.

The vehicle driving assistance system according to the above aspect of the present disclosure may further includes a detection unit configured to detect a forward vehicle that travels on the same lane as the own vehicle, within a predetermined forward vehicle determination distance ahead of the own vehicle, and a following vehicle that travels on the same lane as the own vehicle, within a predetermined following vehicle determination distance behind the own vehicle. The controller may be configured to perform the first constant-speed control, when the forward vehicle and the following vehicle do not exist, and execution of the second constant-speed control is not requested. The controller may be configured to perform the second constant-speed control, when the forward vehicle and the following vehicle do not exist, and execution of the second constant-speed control is requested. In the case where the forward vehicle exists and the following vehicle does not exist, and execution of the second constant-speed control is requested, the controller may be configured to perform deceleration control for reducing the vehicle speed of the own vehicle, when the vehicle speed of the own vehicle is faster than the vehicle speed of the forward vehicle, and a difference between the vehicle speed of the own vehicle and the vehicle speed of the forward vehicle is larger than a predetermined forward approaching vehicle speed difference. In the case where the forward vehicle exists and the following vehicle does not exist, and execution of the second constant-speed control is requested, the controller may be configured to perform acceleration control for increasing the vehicle speed of the own vehicle, when the vehicle speed of the own vehicle is slower than the vehicle speed of the forward vehicle, and a difference between the vehicle speed of the own vehicle and the vehicle speed of the forward vehicle is larger than a predetermined front separating vehicle speed difference, and the vehicle speed of the own vehicle is lower than a lower limit of the second vehicle-speed range.

When the vehicle speed of the own vehicle is faster than the vehicle speed of the forward vehicle, and the difference between these vehicle speeds is large, the distance between the own vehicle and the forward vehicle may become extremely short. In this case, the deceleration control is executed. Thus, the distance between the own vehicle and the forward vehicle can be prevented from becoming extremely short.

Also, when the vehicle speed of the own vehicle is slower than the vehicle speed of the forward vehicle, and the difference between these vehicle speeds is large, and the vehicle speed of the own vehicle is too slow (the vehicle speed of the own vehicle is lower than the lower limit of the second vehicle-speed range), the distance between the own vehicle and the forward vehicle may become extremely long. In this case, the acceleration control is executed. Thus, the distance between the own vehicle and the forward vehicle can be prevented from being extremely long.

The vehicle driving assistance system according to the above aspect of the present disclosure may further include a detection unit configured to detect a forward vehicle that travels on the same lane as the own vehicle, within a predetermined forward vehicle determination distance ahead of the own vehicle, and a following vehicle that travels on the same lane as the own vehicle, within a predetermined following vehicle determination distance behind the own vehicle. The traveling assistance control may include following traveling control for automatically controlling the acceleration of the own vehicle such that a front inter-vehicle distance between the forward vehicle and the own vehicle is kept substantially equal to a set front inter-vehicle distance. The controller may be configured to perform the first constant-speed control, when the forward vehicle and the following vehicle do not exist, and execution of the second constant-speed control is not requested. The controller may be configured to perform the second constant-speed control, when the forward vehicle and the following vehicle do not exist, and execution of the second constant-speed control is requested. In the case where the forward vehicle exists and the following vehicle does not exist, and execution of the second constant-speed control is requested, the controller may be configured to perform deceleration control for reducing the vehicle speed of the own vehicle, when the front inter-vehicle distance is longer than a predetermined front middle distance that is shorter than the predetermined forward vehicle determination distance, and the vehicle speed of the own vehicle is faster than the vehicle speed of the forward vehicle, and a difference between the vehicle speed of the own vehicle and the vehicle speed of the forward vehicle is larger than a predetermined forward approaching vehicle speed difference. In the case where the forward vehicle exists and the following vehicle does not exist, and execution of the second constant-speed control is requested, the controller may be configured to perform the deceleration control, when the front inter-vehicle distance is equal to or shorter than the predetermined front middle distance, and is longer than a predetermined front short distance that is shorter than the predetermined front middle distance. In the case where the forward vehicle exists and the following vehicle does not exist, and the front inter-vehicle distance is equal to or shorter than the predetermined front short distance, the controller may be configured to perform the following traveling control, even when execution of the second constant-speed control is requested.

Under a situation where the distance between the own vehicle and the forward vehicle is relatively short (where the front inter-vehicle distance is longer than the predetermined front middle distance, but is equal to or shorter than the predetermined forward vehicle determination distance), the own vehicle may get considerably close to the forward vehicle when the vehicle speed of the own vehicle is faster than the vehicle speed of the forward vehicle, and the difference between these vehicle speeds is large. In this case, the deceleration control is executed. Thus, the own vehicle can be prevented from getting considerably close to the forward vehicle.

If a change arises in the situation when the distance between the own vehicle and the forward vehicle is considerably short (when the front inter-vehicle distance is longer than the predetermined front short distance, but is equal to or shorter than the predetermined front middle distance), the own vehicle may get close to the forward vehicle, or, in some cases, the own vehicle may contact with the forward vehicle, even if the change is small. In this case, it is desirable to reduce the vehicle speed of the own vehicle, to avoid contact between the own vehicle and the forward vehicle, before it is considered whether the vehicle speed of the own vehicle is faster than the vehicle speed of the forward vehicle. With the above configuration, the deceleration control is executed. As a result, the own vehicle and the forward vehicle are prevented from contacting with each other.

When the distance between the own vehicle and the forward vehicle becomes extremely short (when the forward inter-vehicle distance becomes equal to or shorter than the predetermined forward short distance), the own vehicle may be brought into contact with the forward vehicle if the vehicle speed of the forward vehicle is suddenly reduced, even when the deceleration control is executed to simply reduce the vehicle speed of the own vehicle. In this case, the following traveling control is executed. With this control, the own vehicle is decelerated according to the distance between the own vehicle and the forward vehicle, so that the own vehicle and the forward vehicle can be prevented from contacting with each other.

The vehicle driving assistance system according to the above aspect of the present disclosure may further include a detection unit configured to detect a forward vehicle that travels on the same lane as the own vehicle, within a predetermined forward vehicle determination distance ahead of the own vehicle, and a following vehicle that travels on the same lane as the own vehicle, within a predetermined following vehicle determination distance behind the own vehicle. The controller may be configured to perform the first constant-speed control, when the forward vehicle and the following vehicle do not exist, and execution of the second constant-speed control is not requested. The controller may be configured to perform the second constant-speed control, when the forward vehicle and the following vehicle do not exist, and execution of the second constant-speed control is requested. In the case where the forward vehicle does not exist and the following vehicle exists, and execution of the second constant-speed control is requested, the controller may be configured to perform acceleration control for increasing the vehicle speed of the own vehicle, when a rear inter-vehicle distance between the own vehicle and the following vehicle is longer than a predetermined rear short distance that is shorter than the predetermined following vehicle determination distance, and the vehicle speed of the own vehicle is slower than the vehicle speed of the following vehicle, and a difference between the vehicle speed of the own vehicle and the vehicle speed of the following vehicle is larger than a predetermined rear approaching vehicle speed difference. In the case where the forward vehicle does not exist and the following vehicle exists, and execution of the second constant-speed control is requested, the controller may be configured to perform the acceleration control, when the rear inter-vehicle distance is equal to or shorter than the predetermined rear short distance, and the vehicle speed of the own vehicle is lower than an upper limit of the second vehicle-speed range. In the case where the forward vehicle does not exist and the following vehicle exists, the controller may be configured to perform the first constant-speed control even when execution of the second constant-speed control is requested, when the rear inter-vehicle distance is equal to or shorter than the predetermined rear short distance, and the vehicle speed of the own vehicle is equal to or higher than the upper limit of the second vehicle-speed range.

Under a situation where the distance between the own vehicle and the following vehicle is relatively short (where the rear inter-vehicle distance is longer than the predetermined rear short distance, but is equal to or shorter than the predetermined following vehicle determination distance), the following vehicle may get considerably close to the own vehicle when the vehicle speed of the own vehicle is slower than the vehicle speed of the following vehicle, and the difference between these vehicle speeds is large. In this case, the acceleration control is executed. Thus, the following vehicle can be prevented from getting considerably close to the own vehicle.

If a change arises in the situation when the distance between the own vehicle and the following vehicle is considerably short (when the rear inter-vehicle distance is equal to or shorter than the predetermined rear short distance), the following vehicle may get close to the own vehicle, or, in some cases, the following vehicle may contact with the own vehicle, even if the change is small. In this case, it is desirable to increase the vehicle speed of the own vehicle, to avoid contact between the following vehicle and the own vehicle, unless the vehicle speed of the own vehicle is so fast as to exceed the permissible range (if the vehicle speed of the own vehicle is lower than the upper limit of the second vehicle-speed range). With the above configuration, the acceleration control is executed when the vehicle speed of the own vehicle is not so fast as to exceed the permissible range. Thus, the own vehicle and the forward vehicle are prevented from contacting with each other.

When the distance between the own vehicle and the following vehicle is considerably short (when the rear inter-vehicle distance is equal to or shorter than the predetermined rear short distance), the following vehicle may contact with the own vehicle; therefore, it is effective to execute the acceleration control, so as to avoid the contact. However, when the vehicle speed of the own vehicle is higher than the upper limit of the second vehicle-speed range at this time, the vehicle speed of the own vehicle will largely exceed the upper limit, and the average vehicle speed of the own vehicle may not be controlled to around the set vehicle speed. Accordingly, it is not preferable to execute the acceleration control, from the viewpoint of controlling the average vehicle speed of the own vehicle to around the set vehicle speed. On the other hand, when the distance between the own vehicle and the following vehicle is considerably short even though the vehicle speed of the own vehicle exceeds the upper limit of the second vehicle-speed range (when the rear inter-vehicle distance is equal to or shorter than the predetermined rear short distance, and the vehicle speed of the own vehicle is equal to or higher than the upper limit of the second vehicle-speed range), the vehicle speed of the following vehicle itself may be too fast. In this case, if the vehicle speed of the own vehicle is controlled, using the upper limit and lower limit of the second vehicle-speed range, the range of variations in the vehicle speed of the own vehicle may become large, which, in turn, may result in an increased possibility that the following vehicle contacts with the own vehicle. In this case, the first constant-speed control is executed. Thus, it is possible to control the vehicle speed of the own vehicle to the set vehicle speed, while preventing the following vehicle from contacting with the own vehicle.

The vehicle driving assistance system according to the above aspect of the present disclosure may further include a detection unit configured to detect a forward vehicle that travels on the same lane as the own vehicle, within a predetermined forward vehicle determination distance ahead of the own vehicle. The traveling assistance control may include following traveling control for automatically controlling the acceleration of the own vehicle such that a front inter-vehicle distance between the forward vehicle and the own vehicle is kept substantially equal to a set front inter-vehicle distance. In this case, the controller may be configured to perform the following traveling control, when the forward vehicle exists, and execution of the second constant-speed control is not requested.

Thus, when execution of the second constant-speed control is not requested when the forward vehicle exists, the own vehicle may be caused to travel while following the forward vehicle.

The vehicle driving assistance system as described above may further include a drive unit configured to generate driving force applied to the own vehicle. In this case, the controller may be configured to accelerate and decelerate the own vehicle such that a rate at which the vehicle speed of the own vehicle converges to the set vehicle speed is equal to or higher than a predetermined rate, during execution of the first constant-speed control. The controller may be configured to accelerate and decelerate the own vehicle such that an energy efficiency of the drive unit at a time when the drive unit generates the driving force is equal to or higher than a predetermined efficiency, during execution of the second constant-speed control.

With the above configuration, when the first constant-speed control is performed, the own vehicle is accelerated and decelerated such that the rate of convergence of the vehicle speed of the own vehicle to the set vehicle speed is equal to or higher than the predetermined rate. Thus, the vehicle speed of the own vehicle can be controlled to the set vehicle speed, within a small range of variations in the vehicle speed, as compared with the case where the second constant-speed control is performed. Also, when the second constant-speed control is performed, the own vehicle is accelerated and decelerated, such that the energy efficiency of the drive unit at the time when the drive unit generates the driving force is equal to or higher than the predetermined efficiency. Thus, the vehicle speed of the own vehicle can be controlled to the set vehicle speed at the higher energy efficiency, as compared with the case where the first constant-speed control is performed.

The constituent elements of the present disclosure are not limited to those of embodiments of the present disclosure that will be described below with reference to the drawings. The other objects, other features, and accompanying advantages of the present disclosure will be easily understood from description of the embodiments of the present disclosure.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

Figure 1:
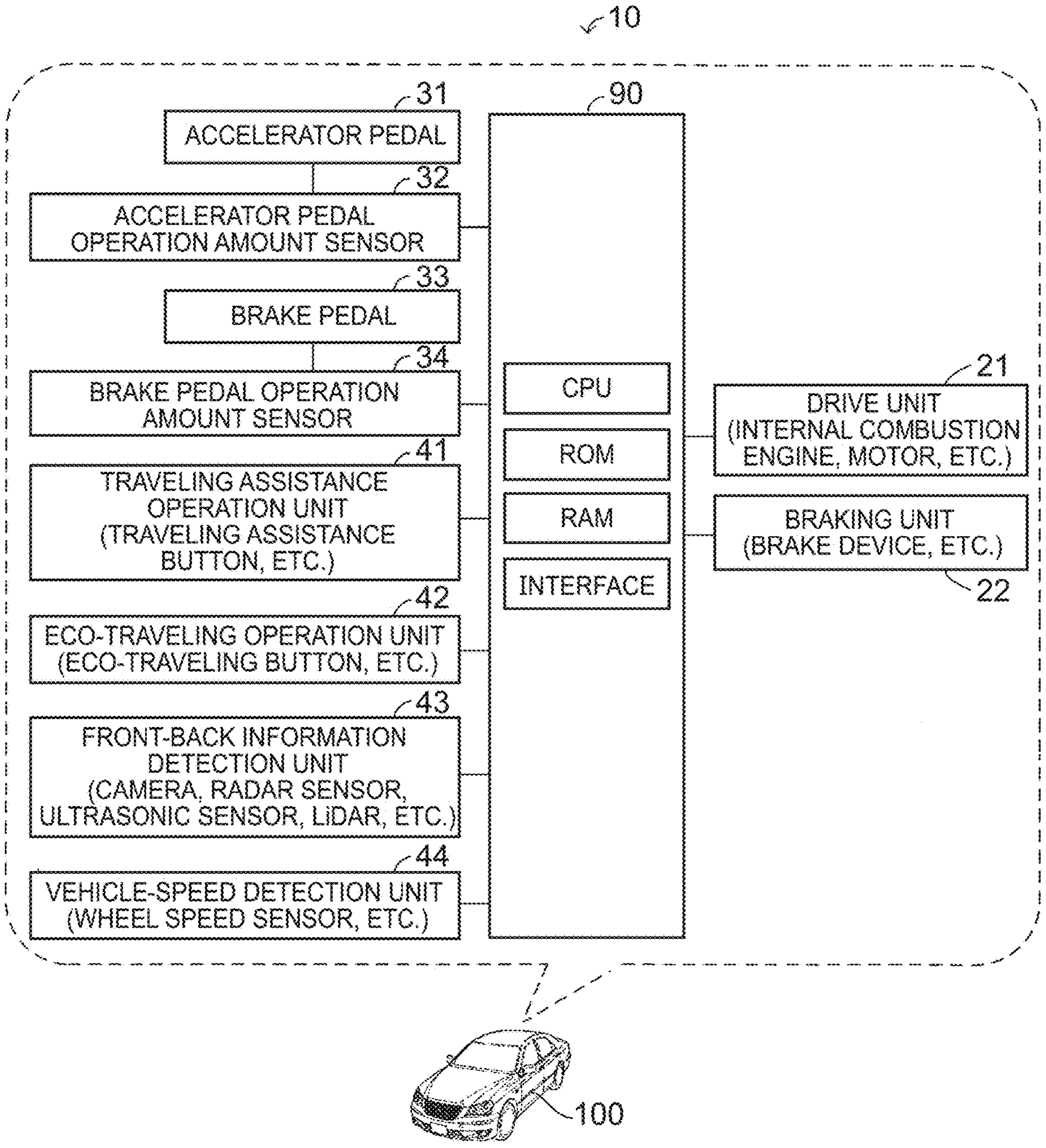
FIG. 1 is a view showing a vehicle driving assistance system according to one embodiment of the present disclosure, and a vehicle (an own vehicle) on which the vehicle driving assistance system is installed.

A vehicle driving assistance system according to one embodiment of the present disclosure will be described with reference to the drawings. FIG. 1 shows the vehicle driving assistance system 10 according to the embodiment of the present disclosure. The vehicle driving assistance system 10 is installed on an own vehicle 100.

The vehicle driving assistance system 10 includes an electronic control unit (ECU) 90. The ECU 90 includes a microcomputer as a main part. The microcomputer includes a central processing unit (CPU), read-only memory (ROM), random access memory (RAM), non-volatile memory, interface, and so forth. The CPU executes instructions or programs or routines stored in the ROM, so as to fulfill various functions.

The own vehicle 100 is equipped with a drive unit 21 and a braking unit 22.

The drive unit 21 consists of devices, such as an internal combustion engine and a motor, that generate driving force applied to the own vehicle 100 so as to propel the own vehicle 100. The drive unit 21 is electrically connected to the ECU 90. The ECU 90 controls operation of the drive unit 21, so as to control the driving force generated from the drive unit 21.

The braking unit 22 is a device, such as a brake device, that generates braking force applied to the own vehicle 100 so as to brake the own vehicle 100. The braking unit 22 is electrically connected to the ECU 90. The ECU 90 controls operation of the braking unit 22, so as to control the braking force generated from the braking unit 22.

Furthermore, the own vehicle 100 is equipped with an accelerator pedal 31, accelerator pedal operation amount sensor 32, brake pedal 33, brake pedal operation amount sensor 34, traveling assistance operation unit 41, eco-traveling operation unit 42, front-back information detection unit 43, and vehicle-speed detection unit 44.

The accelerator pedal operation amount sensor 32 is electrically connected to the ECU 90. The accelerator pedal operation amount sensor 32 detects the operation amount of the accelerator pedal 31, and sends information on the detected operation amount to the ECU 90. The ECU 90 obtains the operation amount of the accelerator pedal 31 as an accelerator pedal operation amount AP, based on the information.

When the accelerator pedal operation amount AP is larger than zero, the ECU 90 obtains a required driving force Pd_req by computation, from the accelerator pedal operation amount AP and the vehicle speed Vown of the own vehicle 100. The required driving force Pd_req is driving force required to be generated by the drive unit 21. The ECU 90 controls operation of the drive unit 21 so that the required driving force Pd_req is generated from the drive unit 21.

The brake pedal operation amount sensor 34 is electrically connected to the ECU 90. The brake pedal operation amount sensor 34 detects the operation amount of the brake pedal 33, and sends information on the detected operation amount to the ECU 90. The ECU 90 obtains the operation amount of the brake pedal 33 as a brake pedal operation amount BP, based on the information.

When the brake pedal operation amount BP is larger than zero, the ECU 90 obtains a required braking force Pb_req by computation, from the brake pedal operation amount BP. The required braking force Pb_req is braking force required to be generated by the braking unit 22. The ECU 90 controls operation of the braking unit 22 so that the required braking force Pb_req is generated from the braking unit 22.

The traveling assistance operation unit 41 is operated by the driver of the own vehicle 100. The traveling assistance operation unit 41 consists of switches, buttons, etc. The switches, buttons, etc. are provided on the steering wheel of the own vehicle 100, or provided on a lever mounted on the steering column of the own vehicle 100, for example.

In this embodiment, the traveling assistance operation unit 41 includes a traveling assistance selection switch, vehicle-speed setting switch, vehicle-speed increase button, vehicle-speed reduction button, and an inter-vehicle distance setting button. The traveling assistance operation unit 41 is electrically connected to the ECU 90.

When the traveling assistance selection switch is operated by the driver while traveling assistance control that will be described later is not performed, a signal is transmitted from the traveling assistance operation unit 41 to the ECU 90. When receiving the signal, the ECU 90 determines that the driver requests execution of the traveling assistance control.

On the other hand, when the traveling assistance selection switch is operated by the driver while the traveling assistance control is performed, a signal is transmitted from the traveling assistance operation unit 41 to the ECU 90. When receiving the signal, the ECU 90 determines that the driver requests the end of the traveling assistance control.

Also, when the vehicle-speed setting switch is operated by the driver while the traveling assistance control is performed, a signal is transmitted from the traveling assistance operation unit 41 to the ECU 90. When receiving the signal, the ECU 90 sets the vehicle speed Vown of the own vehicle 100 at this point in time as a set vehicle speed Vset for use in the traveling assistance control.

When the vehicle-speed increase button is operated by the driver while the traveling assistance control is performed, a signal is transmitted from the traveling assistance operation unit 41 to the ECU 90. When receiving the signal, the ECU 90 increase the set vehicle speed Vset. On the other hand, when the vehicle-speed reduction button is operated by the driver while the traveling assistance control is performed, a signal is transmitted from the traveling assistance operation unit 41 to the ECU 90. When receiving the signal, the ECU 90 reduces the set vehicle speed Vset.

When the inter-vehicle distance setting button is operated by the driver while the traveling assistance control is performed, a signal is transmitted from the traveling assistance operation unit 41 to the ECU 90. The signal, which is also called "requested inter-vehicle distance signal", represents a distance (requested front inter-vehicle distance Dfr_req) that is requested by the driver as a distance (front inter-vehicle distance Dfr) between the own vehicle 100 and a forward vehicle 200*fr* under following traveling control of the traveling assistance control, through the driver's operation of the inter-vehicle distance setting button.

Figure 2:
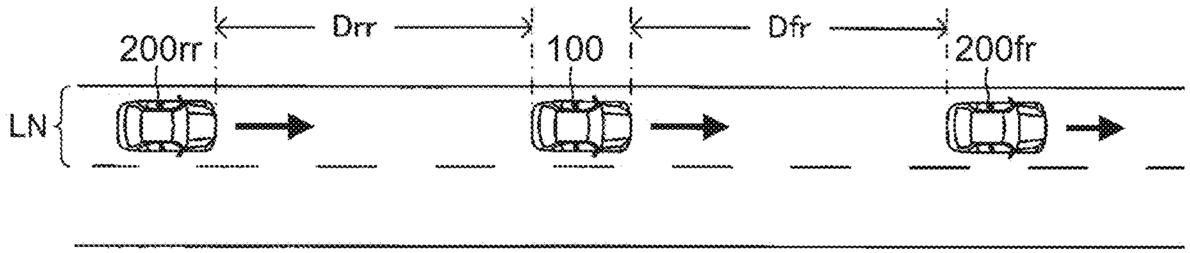
FIG. 2 is a view showing a front inter-vehicle distance and a rear inter-vehicle distance.

As shown in FIG. 2, the front inter-vehicle distance Dfr is a distance between the own vehicle 100 and the forward vehicle 200*fr*. In this embodiment, the forward vehicle 200*fr* is a vehicle traveling ahead of the own vehicle 100 on a lane (own-vehicle lane LN) on which the own vehicle 100 is traveling, and the distance (front inter-vehicle distance Dfr) from the own vehicle 100 to the forward vehicle 200*fr* is equal to or smaller than a predetermined forward vehicle determination distance Dfr_th.

In this embodiment, the driver can select the requested front inter-vehicle distance Dfr_req from three types, i.e., a relatively long distance, a middle distance, and a relatively short distance, by operating the inter-vehicle distance setting button.

When receiving the requested inter-vehicle distance signal, the ECU 90 may set the distance requested as the requested front inter-vehicle distance Dfr_req, as the set front inter-vehicle distance Dfr_set, without taking account of the vehicle speed Vown of the own vehicle 100. However, in this embodiment, the ECU 90 sets the set front inter-vehicle distance Dfr_set, based on the current vehicle speed Vown and the requested front inter-vehicle distance Dfr_req.

More specifically, the ECU 90 determines the front inter-vehicle distance Dfr, such that the time (predicted arrival time TTC) obtained by dividing the front inter-vehicle distance Dfr by the current vehicle speed Vown is equal to a predetermined time (predetermined predicted arrival time TTCref), and sets the front inter-vehicle distance Dfr thus determined, as the set front inter-vehicle distance Dfr_set. Namely, the ECU 90 sets the front inter-vehicle distance Dfr having the relationship of the following equation (1) among the current vehicle speed Vown, predetermined predicted arrival time TTCref, and the front inter-vehicle distance Dfr, as the set front inter-vehicle distance Dfr_set.

$$TTCref = Dfr/Vown \quad (1)$$

The predetermined predicted arrival time TTCref is a relatively long time TTClong when the requested front inter-vehicle distance Dfr_req is a relatively long distance, and is a middle length of time TTCmid when the requested front inter-vehicle distance Dfr_req is a middle distance, while it is a relatively short time TTCshort when the requested front inter-vehicle distance Dfr_req is a relatively short distance.

The predetermined forward vehicle determination distance Dfr_th is determined so as to be longer than the set front inter-vehicle distance Dfr_set.

The eco-traveling operation unit 42 is operated by the driver of the own vehicle 100. The eco-traveling operation unit 42 consists of switches, buttons, etc. The switches, buttons, etc. are provided on the steering wheel of the own vehicle 100, or provided on a lever mounted on the steering column of the own vehicle 100, for example.

The eco-traveling operation unit 42 is placed in the ON position, when it is operated while it is in the OFF position. When operated to the ON position, the eco-traveling operation unit 42 sends a particular signal to the ECU 90. When receiving the signal, the ECU 90 determines that the driver requests execution of eco constant-speed control (second constant-speed control) that will be described later. When the ECU 90 determines that the driver requests execution of the eco constant-speed control (the second constant-speed control), it determines that an eco-traveling condition Ceco is satisfied.

On the other hand, the eco-traveling operation unit 42 is placed in the OFF position, when it is operated while it is in the ON position. When operated to the OFF position, the eco-traveling operation unit 42 sends a particular signal to the ECU 90. When receiving the signal, the ECU 90 determines that the driver does not request execution of the eco constant-speed control (the second constant-speed control). When the ECU 90 determines that the driver does not request execution of the eco constant-speed control (the second constant-speed control), it determines that the eco-traveling condition Ceco is not satisfied.

The front-back information detection unit 43 detects information on the front and rear of the own vehicle 100. For example, the front-back information detection unit 43 includes devices, such as a camera, radar sensor (millimeter-wave radar), ultrasonic sensor (clearance sonar), and laser radar (LiDAR).

The front-back information detection unit 43 is electrically connected to the ECU 90. The front-back information detection unit 43 sends information (front information) on the front side of the own vehicle 100 and information (rear information) on the rear side of the own vehicle 100, to the ECU 90. The ECU 90 obtains the distance (front inter-vehicle distance Dfr) between the forward vehicle 200*fr* and the own vehicle 100, the vehicle speed Vfr of the forward vehicle 200*fr*, etc., from the front information. The ECU 90 also obtains the distance (rear inter-vehicle distance Drr) between a following vehicle 200*rr* and the own vehicle 100, the vehicle speed Vrr of the following vehicle 200*rr*, etc., from the rear information.

As shown in FIG. 2, the rear inter-vehicle distance Drr is the distance between the own vehicle 100 and the following vehicle 200*rr*. In this embodiment, the following vehicle 200*rr* is a vehicle traveling behind the own vehicle 100 on the lane (own-vehicle lane LN) on which the own vehicle 100 is traveling, and the distance (rear inter-vehicle distance Drr) from the own vehicle 100 to the following vehicle 200*rr* is equal to or smaller than a predetermined following vehicle determination distance Drr_th.

The vehicle-speed detection unit 44 is a device, such as a wheel speed sensor, that detects the vehicle speed Vown of the own vehicle 100. The vehicle-speed detection unit 44 is electrically connected to the ECU 90. The vehicle-speed detection unit 44 detects the vehicle speed Vown of the own vehicle 100, and sends information on the vehicle speed Vown to the ECU 90. The ECU 90 obtains the vehicle speed Vown based on the information.

Summary of Operation of Vehicle Driving Assistance System

Next, the operation of the vehicle driving assistance system 10 will be briefly described. The vehicle driving assistance system 10 executes the traveling assistance control when execution of the traveling assistance control is requested. The traveling assistance control includes normal traveling assistance control and eco-traveling assistance control. The normal traveling assistance control includes following traveling control and normal constant-speed control (first constant-speed control), and the eco-traveling assistance control includes the eco constant-speed control (the second constant-speed control), first acceleration/deceleration control, second acceleration/deceleration control, third acceleration/deceleration control, and fourth acceleration/deceleration control.

Normal Traveling Assistance Control

The vehicle driving assistance system 10 executes normal traveling assistance control in the case where the eco-traveling condition Ceco is not satisfied when a traveling assistance execution condition Cacc is satisfied.

When the vehicle driving assistance system 10 determines that the driver has requested execution of the traveling assistance control, it may be configured to determine that the traveling assistance execution condition Cacc is satisfied, irrespective of whether the accelerator pedal 31 or the brake pedal 33 is operated by the driver. However, in this embodiment, the vehicle driving assistance system 10 determines that the traveling assistance execution condition Cacc is satisfied, in the case where neither the accelerator pedal 31 nor the brake pedal 33 is operated by the driver when execution of the traveling assistance control is requested by the driver.

Also, when the vehicle driving assistance system 10 determines that the end of the traveling assistance control is requested by the driver while the traveling assistance control is performed, it determines that the traveling assistance execution condition Cacc ceases to be satisfied, namely, a condition (a traveling assistance control end condition Cend) for finishing the traveling assistance control is satisfied. Also, when the accelerator pedal 31 or the brake pedal 33 is operated by the driver while the traveling assistance control is performed, the vehicle driving assistance system 10 determines that the traveling assistance execution condition Cacc ceases to be satisfied.

When there is a forward vehicle 200*fr*, the vehicle driving assistance system 10 executes following traveling control as the normal traveling assistance control. In this connection, the vehicle driving assistance system 10 determines that the forward vehicle 200*fr* exists, when there is a vehicle that travels ahead of the own vehicle 100 on the own-vehicle lane LN, and the front inter-vehicle distance Dfr is equal to or smaller than the predetermined forward vehicle determination distance Dfr_th.

On the other hand, when there is no forward vehicle 200*fr*, the vehicle driving assistance system 10 executes normal constant-speed control (the first constant-speed control) as the normal traveling assistance control.

The vehicle driving assistance system 10 determines that the forward vehicle 200*fr* exists, when the front inter-vehicle distance Dfr is equal to or smaller than the predetermined forward vehicle determination distance Dfr_th.

Following Traveling Control

When executing the following traveling control, the vehicle driving assistance system 10 accelerates or decelerates the own vehicle 100, so that the front inter-vehicle distance Dfr is kept equal to the set front inter-vehicle distance Dfr_set, in other words, the predicted arrival time TTC is kept equal to the predetermined predicted arrival time TTCref.

In this embodiment, during execution of the following traveling control, the vehicle driving assistance system 10 calculates the acceleration G of the own vehicle 100 required to control the predicted arrival time TTC to the predetermined predicted arrival time TTCref, as the required acceleration Greq. At this time, the vehicle driving assistance system 10 calculates the required acceleration Greq, so that the rate (convergence rate) at which the predicted arrival time TTC converges to the predetermined predicted arrival time TTCref is equal to or higher than a predetermined rate.

Then, the vehicle driving assistance system 10 calculates the required driving force Pd_req or required braking force Pb_req for achieving the required acceleration Greq, and controls operation of the drive unit 21 and/or the braking unit 22 so that the required driving force Pd_req or the required braking force Pb_req is generated, whereby the own vehicle 100 is accelerated or decelerated. Thus, since the vehicle driving assistance system 10 calculates the required acceleration Greq so that the rate at which the predicted arrival time TTC converges to the predetermined predicted arrival time TTCref is equal to or higher than the predetermined rate, as described above, the own vehicle 100 is eventually accelerated and decelerated, such that the rate at which the predicted arrival time TTC converges to the predetermined predicted arrival time TTCref is equal to or higher than the predetermined rate.

Normal Constant-Speed Control (First Constant-Speed Control)

Figure 3A:
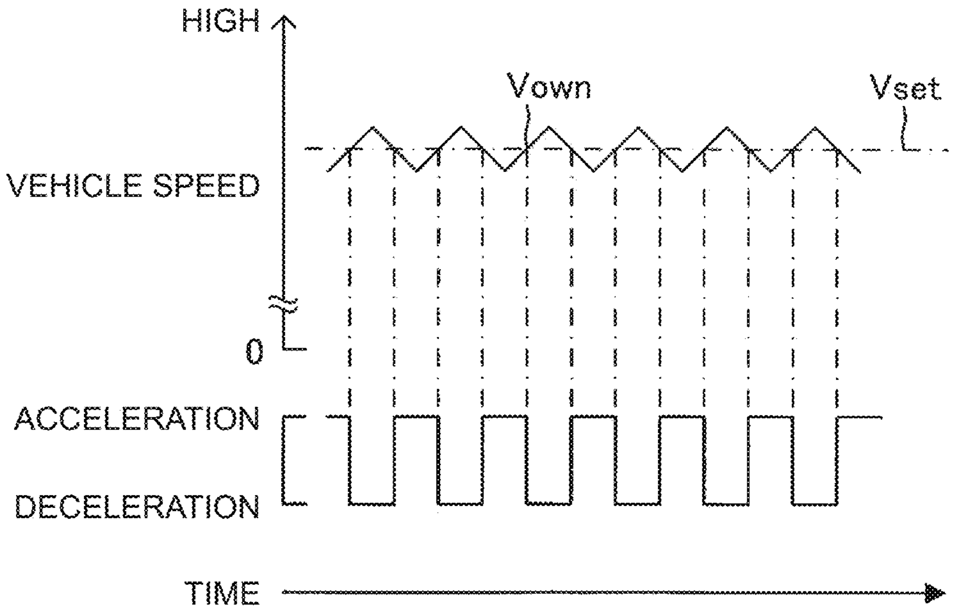
FIG. 3A is a view showing the vehicle speed, etc. of the own vehicle when normal constant-speed control (first constant-speed control) is performed.

When the vehicle driving assistance system 10 executes the normal constant-speed control (the first constant-speed control), it accelerates or decelerates the own vehicle 100 so that the vehicle speed Vown of the own vehicle 100 is kept equal to the set vehicle speed Vset. More specifically, as shown in FIG. 3A, when the vehicle speed Vown decreases to be lower than the set vehicle speed Vset, the vehicle driving assistance system 10 accelerates the own vehicle 100, to increase the vehicle speed Vown. When the vehicle speed Vown increases to be higher than the set vehicle speed Vset, the vehicle driving assistance system 10 decelerates the own vehicle 100, to reduce the vehicle speed Vown.

In this embodiment, during execution of the normal constant-speed control, the vehicle driving assistance system 10 calculates the acceleration G of the own vehicle 100 required to control the vehicle speed Vown of the own vehicle 100 to the set vehicle speed Vset, as the required acceleration Greq. At this time, the vehicle driving assistance system 10 calculates the required acceleration Greq, so that the rate (convergence rate) at which the vehicle speed Vown of the own vehicle 100 converges to the set vehicle speed Vset is equal to or higher than the predetermined rate.

Then, the vehicle driving assistance system 10 calculates the required driving force Pd_req or required braking force Pb_req for achieving the required acceleration Greq, and controls operation of the drive unit 21 and/or the braking unit 22, so that the required driving force Pd_req or the required braking force Pb_req is generated, whereby the own vehicle 100 is accelerated or decelerated. Thus, since the vehicle driving assistance system 10 calculates the required acceleration Greq so that the rate at which the vehicle speed Vown of the own vehicle 100 converges to the set vehicle speed Vset is equal to or higher than the predetermined rate, as described above, the own vehicle 100 is eventually accelerated or decelerated, such that the rate at which the vehicle speed Vown of the own vehicle 100 converges to the set vehicle speed Vset is equal to or higher than the predetermined rate.

In this embodiment, the vehicle driving assistance system 10 accelerates or decelerates the own vehicle 100 on the basis of the set vehicle speed Vset, during execution of the normal constant-speed control (the first constant-speed control). However, the vehicle driving assistance system 10 may be configured to determine a vehicle-speed range (a first vehicle-speed range R1) including the set vehicle speed Vset, according to the set vehicle speed Vset, as a basis on which it determines whether to accelerate or decelerate the own vehicle 100. Then, the vehicle driving assistance system 10 may be configured to accelerate the own vehicle 100 to increase the vehicle speed Vown when the vehicle speed Vown decreases to be lower than the lower limit Vlow1 of the first vehicle-speed range R1, and decelerate the own vehicle 100 to reduce the vehicle speed Vown when the vehicle speed Vown increases to be higher than the upper limit Vup1 of the first vehicle-speed range R1. In this manner, the average vehicle speed Vave of the own vehicle 100 (the average value of the vehicle speed Vown) is controlled to around the set vehicle speed Vset.

Eco-Traveling Assistance Control

The vehicle driving assistance system 10 executes the eco-traveling assistance control, in the case where the eco-traveling condition Ceco is satisfied when the traveling assistance execution condition Cacc is satisfied. At this time, the vehicle driving assistance system 10 executes the eco-traveling assistance control according to the presence or absence of the forward vehicle 200*fr*, the presence or absence of the following vehicle 200*rr*, etc.

Eco Constant-Speed Control (Second Constant-Speed Control)

When there is no forward vehicle 200*fr* and no following vehicle 200*rr* when the eco-traveling assistance control is executed, the vehicle driving assistance system 10 executes the eco constant-speed control (the second constant-speed control) as the eco-traveling assistance control.

During execution of the eco constant-speed control (the second constant-speed control), the vehicle driving assistance system 10 determines a vehicle-speed range (a second vehicle-speed range R2) including the set vehicle speed Vset, according to the set vehicle speed Vset, as a basis on which it determines whether the own vehicle 100 is accelerated or decelerated.

Figure 3B:
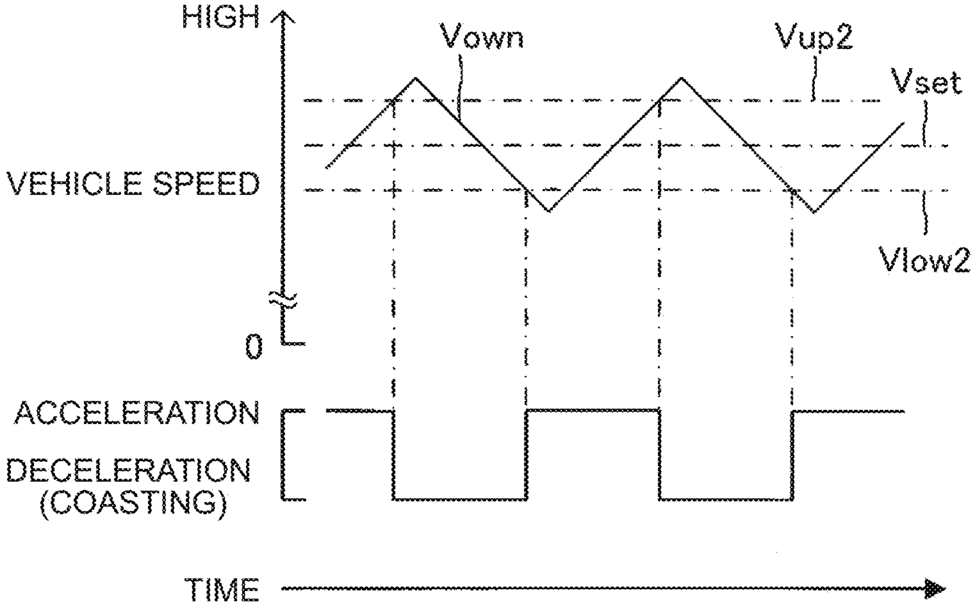
FIG. 3B is a view showing the vehicle speed, etc. of the own vehicle when eco constant-speed control (second constant-speed control) is performed.

Then, as shown in FIG. 3B, the vehicle driving assistance system 10 accelerates the own vehicle 100 to increase the vehicle speed Vown, when the vehicle speed Vown decreases to be lower than the lower limit Vlow2 of the second vehicle-speed range R2, and decelerates the own vehicle 100 to reduce the vehicle speed Vown, when the vehicle speed Vown increases to be higher than the upper limit Vup2 of the second vehicle-speed range R2. In this manner, the average vehicle speed Vave of the own vehicle 100 (the average value of the vehicle speed Vown) is controlled to around the set vehicle speed Vset.

In this embodiment, the second vehicle-speed range R2 is set to a wider range than the first vehicle-speed range R1.

Also, where the set vehicle speed Vset is the same value, the upper limit Vup2 of the second vehicle-speed range R2 is set to a larger value than the upper limit Vup1 of the first vehicle-speed range R1, and the lower limit Vlow2 of the second vehicle-speed range R2 is set to a smaller value than the lower limit Vlow1 of the first vehicle-speed range R1.

Also, in this embodiment, when the vehicle driving assistance system 10 accelerates the own vehicle 100, during execution of the eco constant-speed control (the second constant-speed control), it calculates, as the required acceleration Greq, the acceleration G of the own vehicle 100 at which the energy efficiency of the drive unit 21 at the time when the drive unit 21 generates the driving force Pd is equal to or higher than a predetermined efficiency when the current vehicle speed Vown of the own vehicle 100 is taken into consideration.

Then, the vehicle driving assistance system 10 calculates the required driving force Pd_req so as to achieve the required acceleration Greq, and accelerates the own vehicle 100 by controlling operation of the drive unit 21 so that the required driving force Pd_req is generated from the drive unit 21. Thus, since the vehicle driving assistance system 10 calculates the required acceleration Greq so that the energy efficiency of the drive unit 21 at the time when the drive unit 21 generates the driving force Pd is equal to or higher than the predetermined efficiency, as described above, the own vehicle 100 is eventually accelerated, so that the energy efficiency of the drive unit 21 at the time when the drive unit 21 generates the driving force Pd is equal to or higher than the predetermined efficiency.

On the other hand, when the vehicle driving assistance system 10 decelerates the own vehicle 100, during execution of the eco constant-speed control (the second constant-speed control) of this embodiment, it calculates the acceleration G at which the required driving force Pd_req is equal to zero, as the required acceleration Greq.

Then, the vehicle driving assistance system 10 calculates the required driving force Pd_req for achieving the required acceleration Greq, and decelerates the own vehicle 100 by controlling operation of the drive unit 21 so that the required driving force Pd_req is generated from the drive unit 21 (namely, the driving force Pd generated from the drive unit 21 becomes equal to zero). In other words, the vehicle driving assistance system 10 causes the own vehicle 100 to coast.

Where the drive unit 21 includes a motor, the vehicle driving assistance system 10 may be configured to decelerate the own vehicle 100, by rotating the motor with traveling energy of the own vehicle 100 to regenerate electric power, when the own vehicle 100 is decelerated, during execution of the eco constant-speed control (the second constant-speed control) of this embodiment.

Other Eco-Traveling Assistance Control

When there is a forward vehicle 200*fr* but there is no following vehicle 200*rr*, upon execution of the eco-traveling assistance control, the vehicle driving assistance system 10 determines whether the front inter-vehicle distance Dfr is longer than a predetermined front middle distance Dfr_mid. The predetermined front middle distance Dfr_mid is set to a distance that is shorter than the predetermined forward vehicle determination distance Dfr_th.

First Acceleration/Deceleration Control

When the vehicle driving assistance system 10 determines that the front inter-vehicle distance Dfr is longer than the predetermined front middle distance Dfr_mid, it executes first acceleration/deceleration control as described below.

Upon execution of the first acceleration/deceleration control, the vehicle driving assistance system 10 initially determines whether the own vehicle 100 is approaching the forward vehicle 200*fr* at a relatively high speed. More specifically, the vehicle driving assistance system 10 determines whether the vehicle speed Vown of the own vehicle 100 is faster than the vehicle speed Vfr of the forward vehicle 200*fr*, and a difference ΔVfr between these vehicle speeds is larger than a predetermined front approaching vehicle speed difference ΔVfr_a.

Figure 4A:
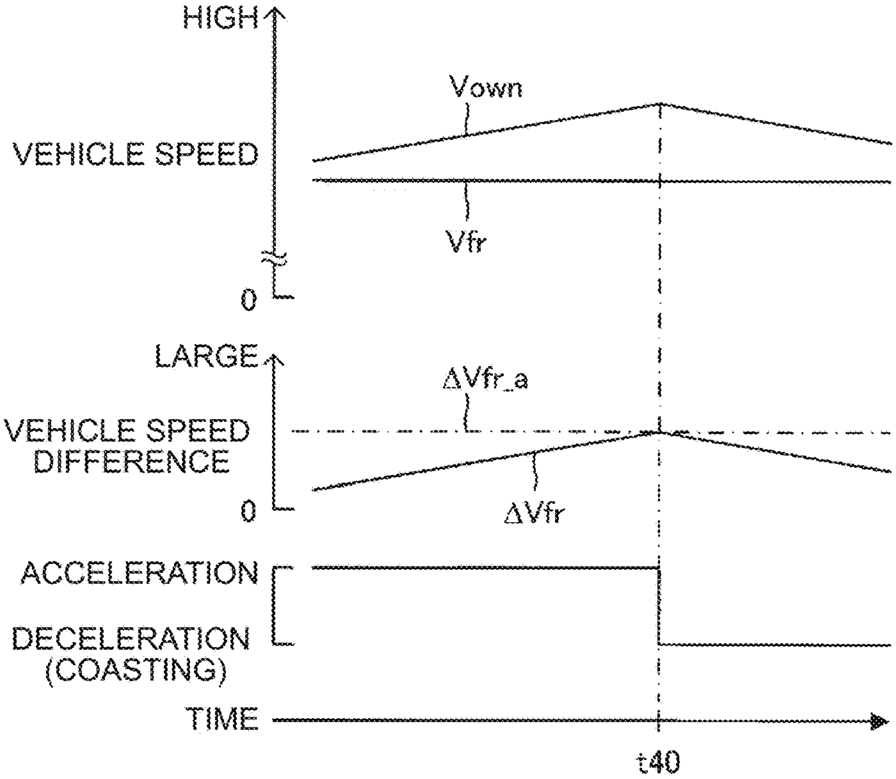
FIG. 4A is a view showing the vehicle speed, etc. of the own vehicle when first acceleration/deceleration control is performed in a condition where the vehicle speed of the own vehicle is faster than the vehicle speed of a forward vehicle.

As shown in FIG. 4A, when the vehicle driving assistance system 10 determines that the vehicle speed Vown of the own vehicle 100 is faster than the vehicle speed Vfr of the forward vehicle 200*fr*, and the difference ΔVfr between the vehicle speeds is larger than the predetermined front approaching vehicle speed difference ΔVfr_a (at time t40 in FIG. 4A), the vehicle driving assistance system 10 decelerates the own vehicle 100, to reduce the vehicle speed Vown of the own vehicle 100.

At this time, the vehicle driving assistance system 10 decelerates the own vehicle 100 by controlling operation of the drive unit 21 so as to cause the own vehicle 100 to coast, as described above.

On the other hand, when the vehicle driving assistance system 10 does not determine that the vehicle speed Vown of the own vehicle 100 is faster than the vehicle speed Vfr of the forward vehicle 200*fr*, and the difference ΔVfr between the vehicle speeds is larger than the predetermined front approaching vehicle speed difference ΔVfr_a, it determines whether the vehicle speed Vown of the own vehicle 100 is considerably slow, and the own vehicle 100 is being spaced apart from the forward vehicle 200*fr* at a relatively high speed. More specifically, the vehicle driving assistance system 10 determines whether the vehicle speed Vown of the own vehicle 100 is lower than the lower limit Vlow2 of the second vehicle-speed range R2, and the vehicle speed Vown of the own vehicle 100 is slower than the vehicle speed Vfr of the forward vehicle 200*fr* and the difference ΔVfr between these vehicle speeds is larger than a predetermined front separating vehicle speed difference ΔVfr_b.

The predetermined front separating vehicle speed difference ΔVfr_b may be the same value as or different from the predetermined front approaching vehicle speed difference ΔVfr_a.

Figure 4B:
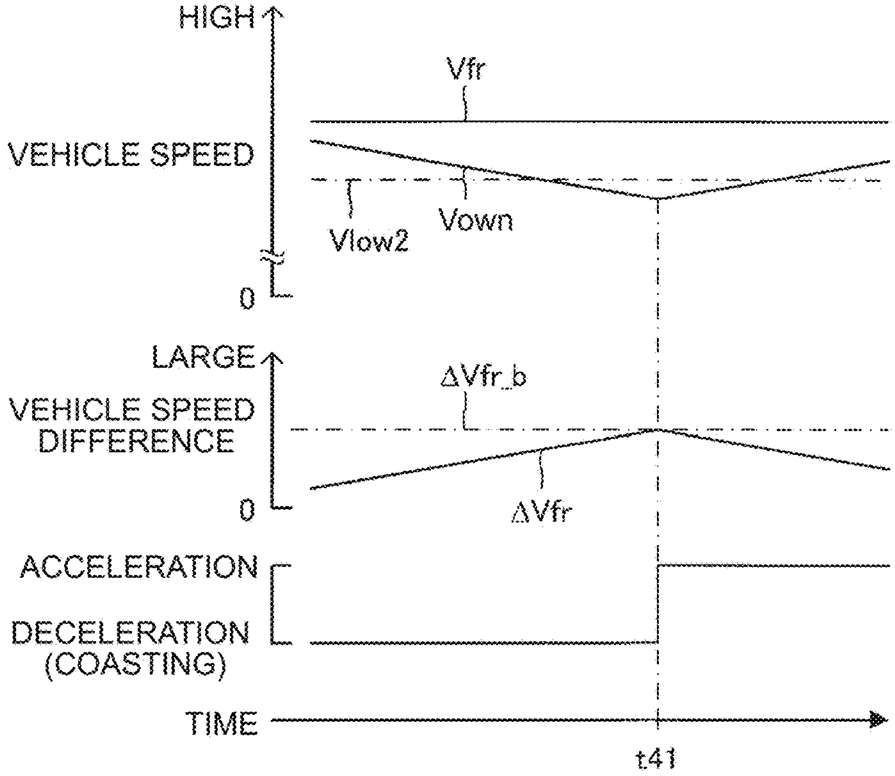
FIG. 4B is a view showing the vehicle speed, etc. of the own vehicle when the first acceleration/deceleration control is performed in a condition where the vehicle speed of the own vehicle is slower than the vehicle speed of the forward vehicle.

As shown in FIG. 4B, when the vehicle driving assistance system 10 determines that the vehicle speed Vown of the own vehicle 100 is lower than the lower limit Vlow2 of the second vehicle-speed range R2, and the vehicle speed Vown of the own vehicle 100 is slower than the vehicle speed Vfr of the forward vehicle 200*fr* and the difference ΔVfr between these vehicle speeds is larger than the predetermined front separating vehicle speed difference ΔVfr_b (at time t41 in FIG. 4B), the vehicle driving assistance system 10 accelerates the own vehicle 100, to increase the vehicle speed Vown of the own vehicle 100.

At this time, too, the vehicle driving assistance system 10 calculates, as the required acceleration Greq, the acceleration G of the own vehicle 100 at which the energy efficiency of the drive unit 21 at the time when the drive unit 21 generates the driving force Pd is equal to or higher than the predetermined efficiency when the current vehicle speed Vown of the own vehicle 100 is taken into consideration, as described above.

Then, the vehicle driving assistance system 10 calculates the required driving force Pd_req for achieving the required acceleration Greq, and controls operation of the drive unit 21 so that the required driving force Pd_req is generated from the drive unit 21, thereby to accelerate the own vehicle 100.

On the other hand, when the vehicle driving assistance system 10 does not determine that the vehicle speed Vown of the own vehicle 100 is lower than the lower limit Vlow2 of the second vehicle-speed range R2, and the vehicle speed Vown of the own vehicle 100 is slower than the vehicle speed Vfr of the forward vehicle 200*fr* and the difference ΔVfr between these vehicle speeds is larger than the predetermined front separating vehicle speed difference ΔVfr_b, the vehicle driving assistance system 10 continues to accelerate the own vehicle 100 when the own vehicle 100 is being accelerated, and continues to decelerate the own vehicle 100 when the own vehicle 100 is being decelerated.

Second Acceleration/Deceleration Control

When the vehicle driving assistance system 10 determines that the front inter-vehicle distance Dfr is equal to or smaller than the predetermined front middle distance Dfr_mid, it executes second acceleration/deceleration control as described below.

Upon execution of the second acceleration/deceleration control, the vehicle driving assistance system 10 initially determines whether the front inter-vehicle distance Dfr is longer than a predetermined front short distance Dfr_short. The predetermined front short distance Dfr_short is set to a distance that is shorter than the predetermined front middle distance Dfr_mid.

Figure 5:
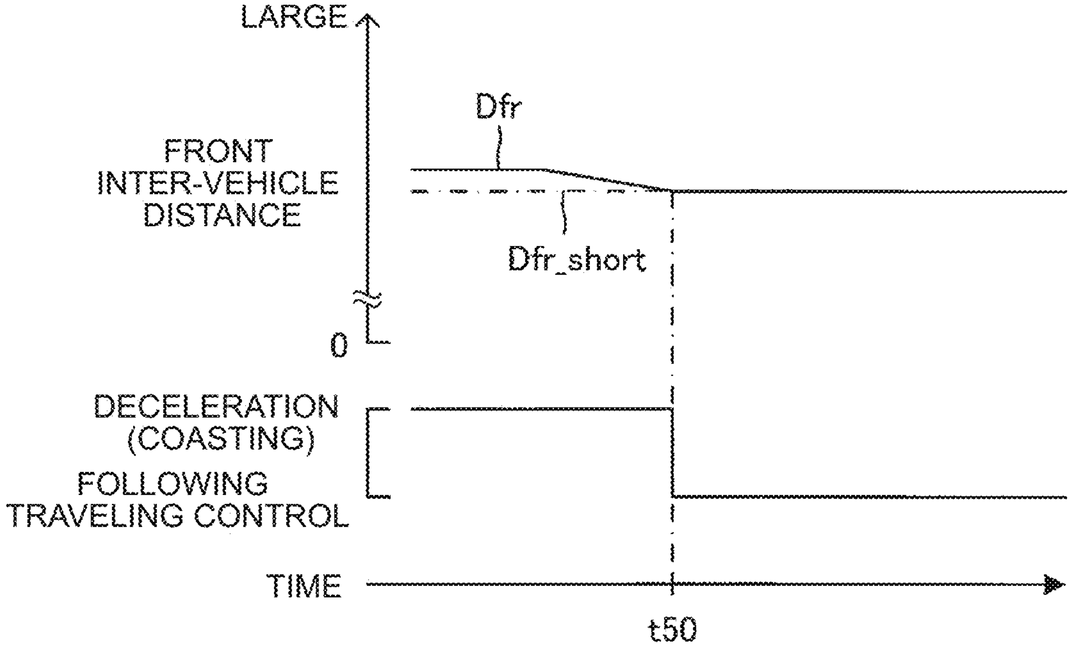
FIG. 5 is a view showing the front inter-vehicle distance, etc. when second acceleration/deceleration control is performed.

As shown in FIG. 5, when the vehicle driving assistance system 10 determines that the front inter-vehicle distance Dfr is longer than the predetermined front short distance Dfr_short (before time t50 in FIG. 5), it decelerates the own vehicle 100, to reduce the vehicle speed Vown of the own vehicle 100.

At this time, the vehicle driving assistance system 10 decelerates the own vehicle 100 by controlling operation of the drive unit 21 so as to cause the own vehicle 100 to coast, as described above.

On the other hand, when the vehicle driving assistance system 10 determines that the front inter-vehicle distance Dfr is equal to or smaller than the predetermined front short distance Dfr_short (at time t50 in FIG. 5), it executes the normal traveling assistance control. At this time, since the forward vehicle 200*fr* exists, the vehicle driving assistance system 10 executes the following traveling control as the normal traveling assistance control.

Case where Only the Following Vehicle Exists

In the case where there is no forward vehicle 200*fr* but there is a following vehicle 200*rr* when the eco-traveling assistance control is executed, the vehicle driving assistance system 10 determines whether the rear inter-vehicle distance Drr is longer than a predetermined rear short distance Drr_short. The predetermined rear short distance Drr_short is set to a distance that is shorter than the predetermined following vehicle determination distance Drr_th.

Third Acceleration/Deceleration Control

When the vehicle driving assistance system 10 determines that the rear inter-vehicle distance Drr is longer than the predetermined rear short distance Drr_short, it executes third acceleration/deceleration control as described below.

Specifically, upon execution of the third acceleration/deceleration control, the vehicle driving assistance system 10 initially determines whether the following vehicle 200*rr* is approaching the own vehicle 100 at a relatively high speed, and the own vehicle 100 is allowed to increase the vehicle speed Vown. More specifically, the vehicle driving assistance system 10 determines whether the vehicle speed Vown of the own vehicle 100 is slower than the vehicle speed Vrr of the following vehicle 200*rr*, and a difference ΔVrr between these vehicle speeds is larger than a predetermined rear approaching vehicle speed difference ΔVrr_a, and whether the vehicle speed Vown of the own vehicle 100 is lower than the upper limit Vup2 of the second vehicle-speed range R2.

Figure 6A:
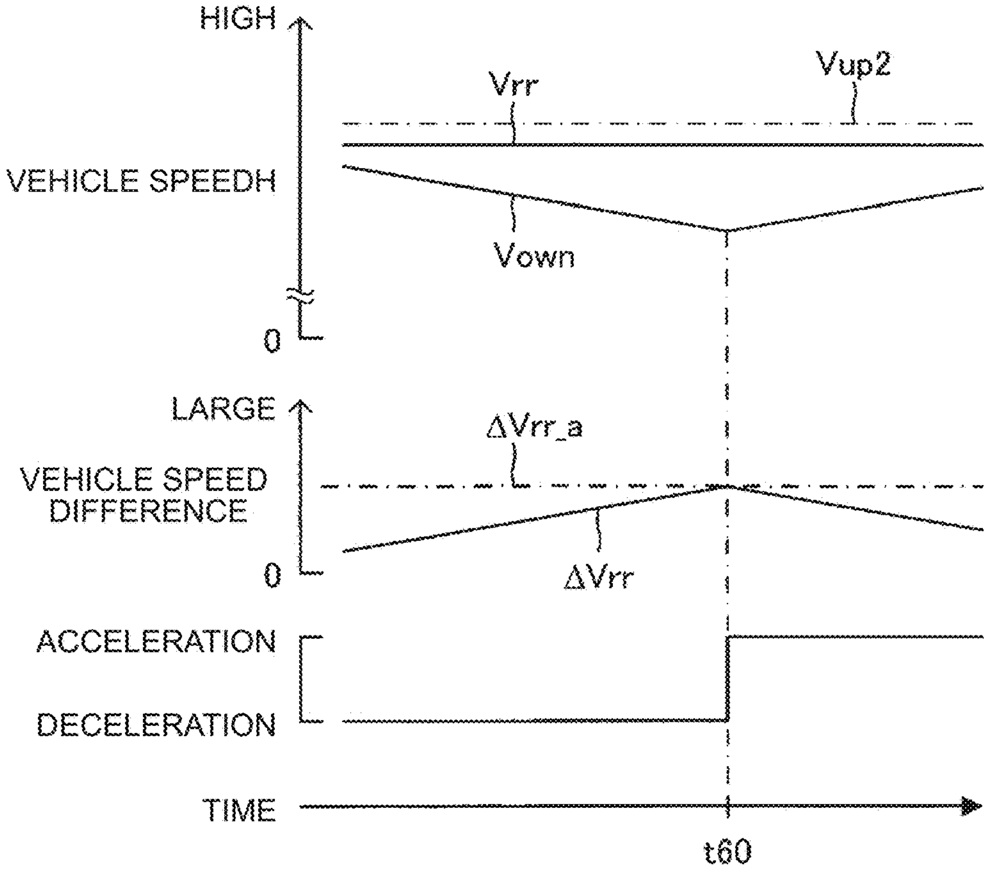
FIG. 6A is a view showing the vehicle speed, etc. of the own vehicle when third acceleration/deceleration control is performed.

As shown in FIG. 6A, when the vehicle driving assistance system 10 determines that the vehicle speed Vown of the own vehicle 100 is slower than the vehicle speed Vrr of the following vehicle 200*rr*, and the difference ΔVrr between these vehicle speeds is larger than the predetermined rear approaching vehicle speed difference ΔVrr_a, and that the vehicle speed Vown of the own vehicle 100 is lower than the upper limit Vup2 of the second vehicle-speed range R2 (at time t60 in FIG. 6A), the vehicle driving assistance system 10 accelerates the own vehicle 100, to increase the vehicle speed Vown of the own vehicle 100.

At this time, too, the vehicle driving assistance system 10 calculates, as the required acceleration Greq, the acceleration G of the own vehicle 100 at which the energy efficiency of the drive unit 21 at the time when the drive unit 21 generates the driving force Pd is equal to or higher than the predetermined efficiency when the current vehicle speed Vown of the own vehicle 100 is taken into consideration, as described above.

Then, the vehicle driving assistance system 10 calculates the required driving force Pd_req for achieving the required acceleration Greq, and accelerates the own vehicle 100 by controlling operation of the drive unit 21 so that the required driving force Pd_req is generated from the drive unit 21.

On the other hand, when the vehicle driving assistance system 10 does not determine that the vehicle speed Vown of the own vehicle 100 is slower than the vehicle speed Vrr of the following vehicle 200*rr*, and the difference ΔVrr between these vehicle speeds is larger than the predetermined rear approaching vehicle speed difference ΔVrr_a, and that the vehicle speed Vown of the own vehicle 100 is lower than the upper limit Vup2 of the second vehicle-speed range R2, the vehicle driving assistance system 10 continues to accelerate the own vehicle 100 when the own vehicle 100 is being accelerated, and continues to decelerate the own vehicle 100 when the own vehicle 100 is being decelerated.

Fourth Acceleration/Deceleration Control

The vehicle driving assistance system 10 executes fourth acceleration/deceleration control as described below, when it determines that the rear inter-vehicle distance Drr is equal to or smaller than the predetermined rear short distance Drr_short.

Specifically, upon execution of the fourth acceleration/deceleration control, the vehicle driving assistance system 10 initially determines whether the vehicle speed Vown of the own vehicle 100 is lower than the upper limit Vup2 of the second vehicle-speed range R2.

Figure 6B:
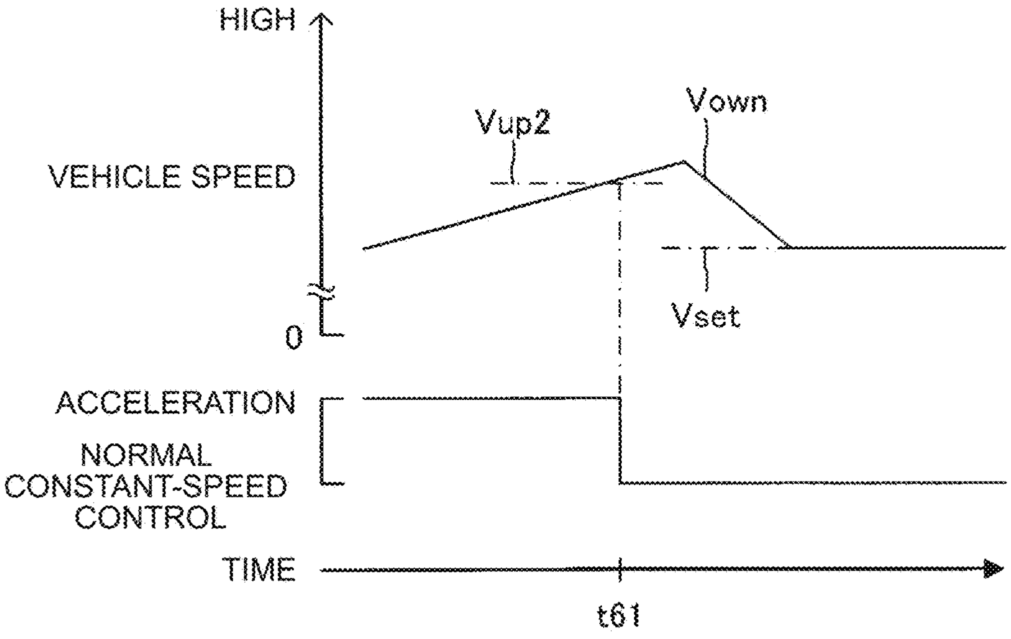
FIG. 6B is a view showing the vehicle speed, etc. of the own vehicle when fourth acceleration/deceleration control is performed.

As shown in FIG. 6B, when the vehicle driving assistance system 10 determines that the vehicle speed Vown of the own vehicle 100 is lower than the upper limit Vup2 of the second vehicle-speed range R2 (before time t61 in FIG. 6B), it accelerates the own vehicle 100, to increase the vehicle speed Vown of the own vehicle 100.

At this time, too, the vehicle driving assistance system 10 calculates, as the required acceleration Greq, the acceleration G of the own vehicle 100 at which the energy efficiency of the drive unit 21 at the time when the drive unit 21 generates the driving force Pd is equal to or higher than the predetermined efficiency when the current vehicle speed Vown of the own vehicle 100 is taken into consideration.

Then, the vehicle driving assistance system 10 calculates the required driving force Pd_req for achieving the required acceleration Greq, and controls operation of the drive unit 21 so that the required driving force Pd_req is generated from the drive unit 21, thereby to accelerate the own vehicle 100.

On the other hand, when the vehicle driving assistance system 10 determines that the vehicle speed Vown of the own vehicle 100 is equal to or higher than the upper limit Vup2 of the second vehicle-speed range R2 (at time t61 in FIG. 6B), it executes the normal traveling assistance control. At this time, since there is no forward vehicle 200*fr*, the vehicle driving assistance system 10 executes normal constant-speed control (the first constant-speed control) as the normal traveling assistance control.

Case where Forward Vehicle and Following Vehicle Exist

In the case where there are a forward vehicle 200*fr* and a following vehicle 200*rr*, the vehicle driving assistance system 10 executes the normal traveling assistance control, even when the eco-traveling condition Ceco is satisfied when the traveling assistance execution condition Cacc is satisfied. At this time, since the forward vehicle 200*fr* exists, the vehicle driving assistance system 10 executes the following traveling control.

Effects

Figure 7:
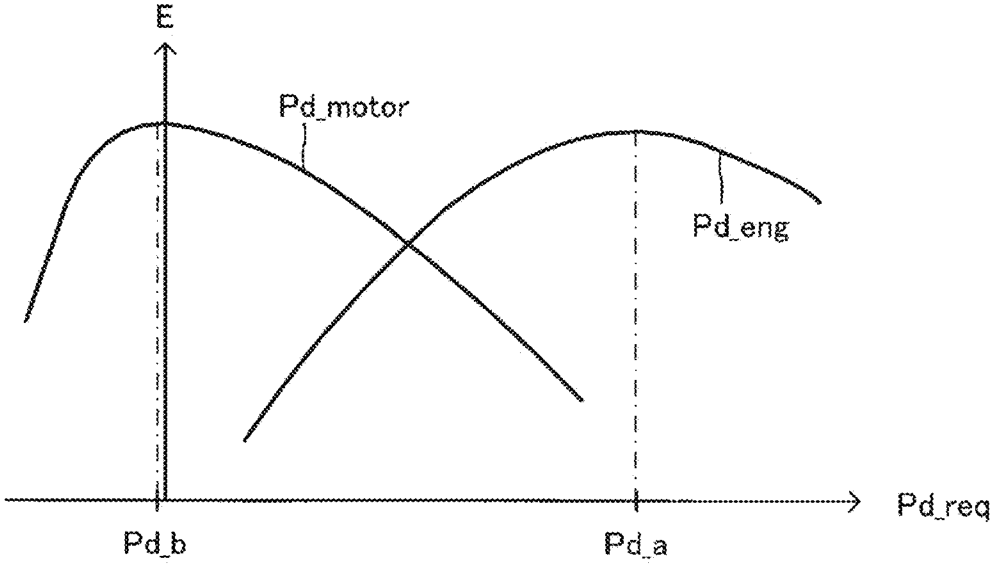
FIG. 7 is a view showing the energy efficiency of an internal combustion engine, the energy efficiency of a motor, and the required driving force.

The energy efficiency E at the time when the drive unit 21 generates the driving force has a characteristic that it becomes highest (reaches its peak) when the driving force Pd generated by the drive unit 21 has a particular value. When the drive unit 21 includes an internal combustion engine and a motor, for example, the energy efficiency Eeng (in particular, the fuel efficiency) at the time when the internal combustion engine generates the driving force reaches the highest level when the driving force Pd_eng generated by the engine has a certain value Pd_a, and the energy efficiency Emotor (in particular, the power efficiency) at the time when the motor generates the driving force reaches the highest level when the driving force Pd_motor generated by the motor has a value Pd b that is smaller than the above-mentioned value Pd_a, as shown in FIG. 7.

Thus, while operation of the drive unit 21 is controlled so that the driving force is generated from the drive unit 21, the drive unit 21 can be operated in a condition where the energy efficiency is higher, as the degree of freedom in control performed on the drive unit 21 is larger.

Generally, when the vehicle speed is controlled to a particular vehicle speed, the degree of freedom in control when operation of the drive unit is controlled so as to generate driving force (vehicle driving force) applied to the vehicle is increased as the vehicle speed is controlled while being allowed to vary within the wider range of the vehicle speed. As a result, control that provides the higher energy efficiency can be selected as the control performed on the drive unit. According to the vehicle driving assistance system 10, the normal constant-speed control (the first constant-speed control) based on the set vehicle speed Vset that is allowed to vary within the narrow range of the vehicle speed, and the eco constant-speed control (the second constant-speed control) based on the second vehicle-speed range R2 having the wider range of allowable vehicle-speed variations, are prepared as the traveling assistance controls, and the eco constant-speed control is executed according to the traveling state of the own vehicle 100. Thus, it is possible to cause the own vehicle 100 to travel, while controlling the vehicle speed Vown of the own vehicle 100 to around the set vehicle speed Vset with the higher energy efficiency.

Specific Operation of Vehicle Driving Assistance System

Next, specific operation of the vehicle driving assistance system 10 will be described. The CPU of the ECU 90 of the vehicle driving assistance system 10 executes a routine shown in FIG. 8 each time a predetermined computation time elapses. Thus, when the timing is right, the CPU starts processing from step 800 of FIG. 8, and proceeds to step 805, to determine whether the traveling assistance execution condition Cacc is satisfied.

When an affirmative decision (YES) is obtained in step 805, the CPU proceeds to step 810, to determine whether the eco-traveling condition Ceco is satisfied.

When an affirmative decision (YES) is obtained in step 810, the CPU proceeds to step 815, to determine whether the rear inter-vehicle distance Drr is longer than the predetermined following vehicle determination distance Drr_th.

Figure 9:
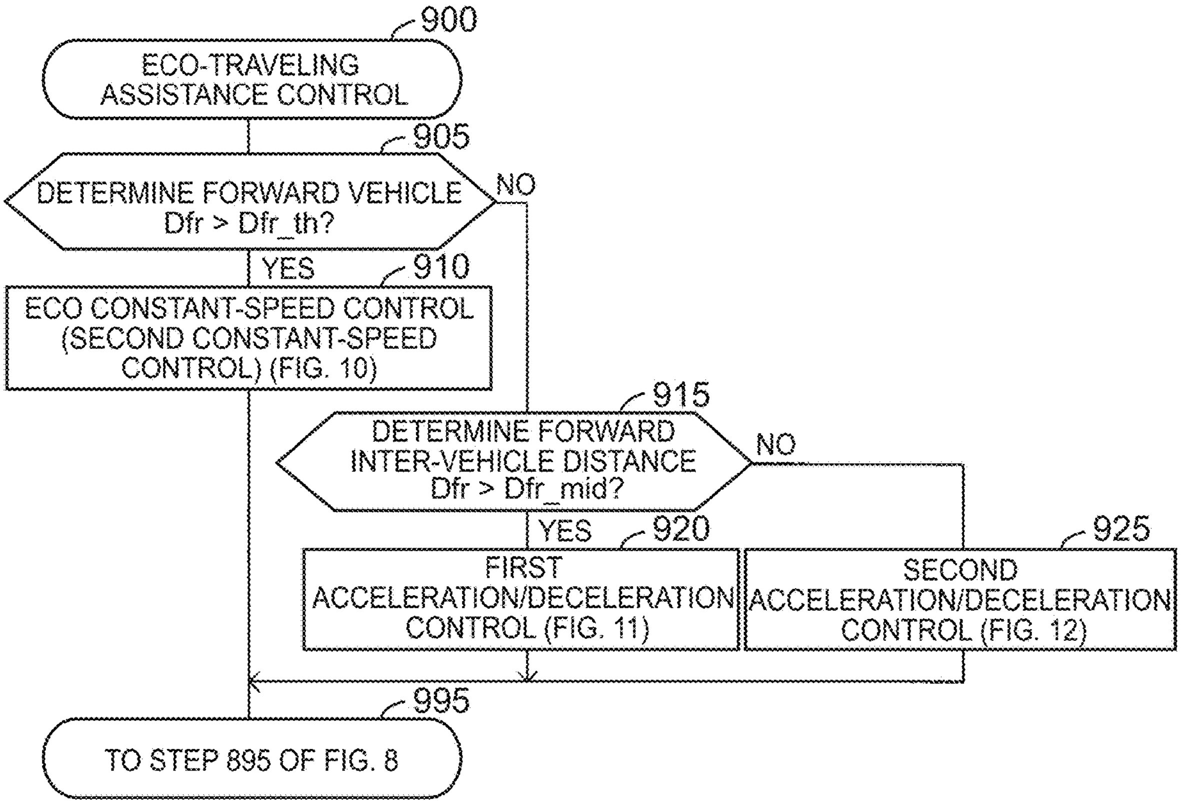
FIG. 9 is a flowchart illustrating a routine executed by the vehicle driving assistance system according to the embodiment of the present disclosure.

When an affirmative decision (YES) is obtained in step 815, the CPU proceeds to step 820, to execute a routine shown in FIG. 9. Thus, when proceeding to step 820, the CPU starts processing from step 900 of FIG. 9, and proceeds to step 905, to determine whether the front inter-vehicle distance Dfr is longer than the predetermined forward vehicle determination distance Dfr_th.

Figure 10:
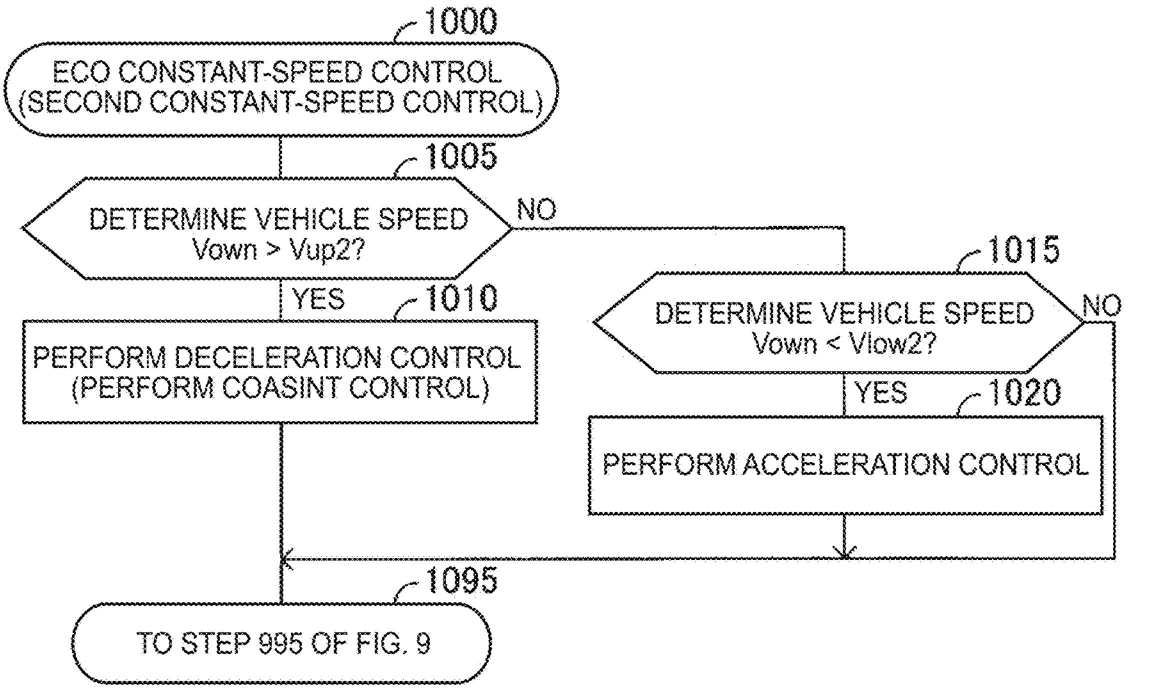
FIG. 10 is a flowchart illustrating a routine executed by the vehicle driving assistance system according to the embodiment of the present disclosure.

When an affirmative decision (YES) is obtained in step 905, the CPU proceeds to step 910, and executes a routine shown in FIG. 10 so as to perform the eco constant-speed control (the second constant-speed control). Thus, when proceeding to step 910, the CPU starts processing from step 1000 of FIG. 10, and proceeds to step 1005, to determine whether the vehicle speed Vown of the own vehicle 100 is higher than the upper limit Vup2 of the second vehicle-speed range R2.

When an affirmative decision (YES) is obtained in step 1005, the CPU proceeds to step 1010, to perform deceleration control so as to decelerate the own vehicle 100.

In this embodiment, the deceleration control performed in step 1010 and some steps that will be described later is control for decelerating the own vehicle 100 by controlling operation of the drive unit 21 so as to cause the own vehicle 100 to coast. Accordingly, the deceleration control may also be referred to as "coasting control".

Figure 8:
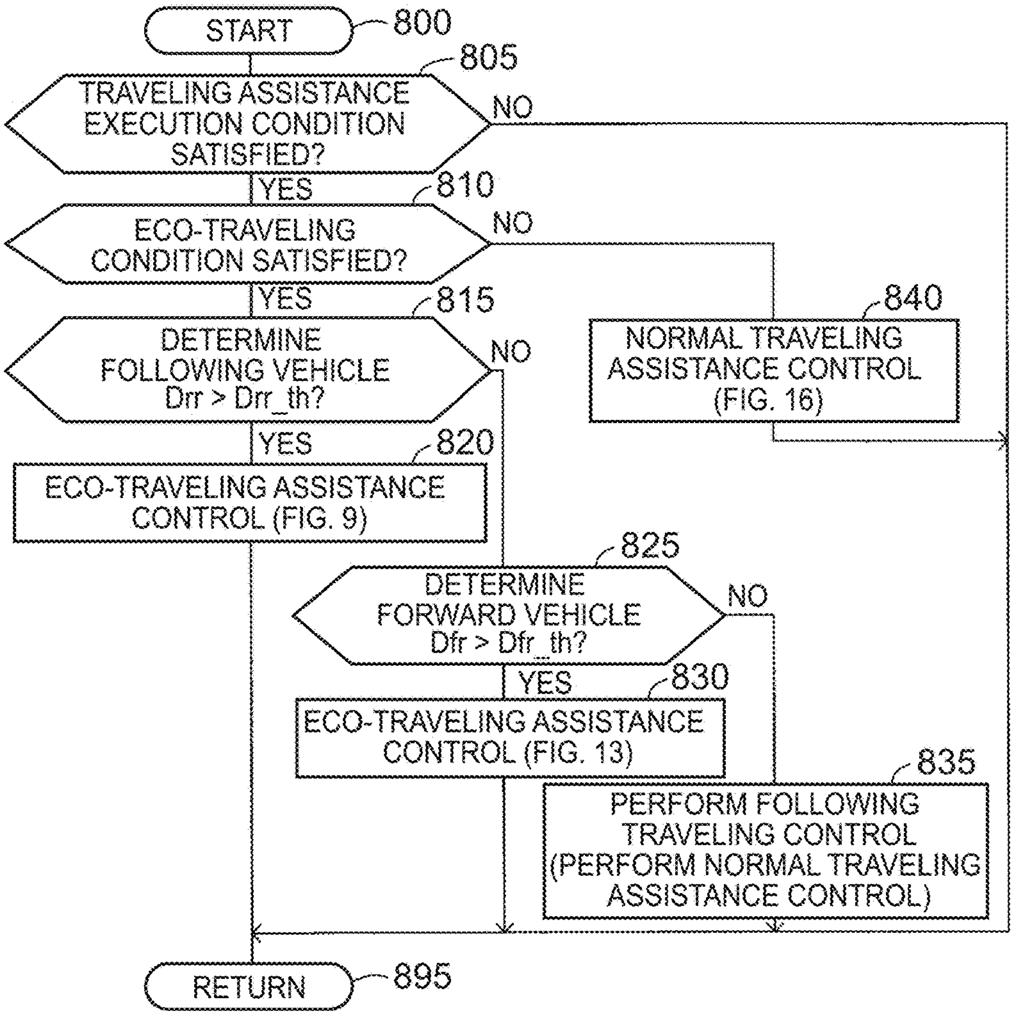
FIG. 8 is a flowchart illustrating a routine executed by the vehicle driving assistance system according to the embodiment of the present disclosure.

Then, the CPU proceeds to step 895 of FIG. 8 via step 1095 and step 995 of FIG. 9, and once finishes this routine.

On the other hand, when a negative decision (NO) is obtained in step 1005, the CPU proceeds to step 1015, to determine whether the vehicle speed Vown of the own vehicle 100 is lower than the lower limit Vlow2 of the second vehicle-speed range R2.

When an affirmative decision (YES) is obtained in step 1015, the CPU proceeds to step 1020, to perform acceleration control so as to accelerate the own vehicle 100.

In this embodiment, under the acceleration control performed in step 1020 and some steps that will be described later, the acceleration G of the own vehicle 100 at which the energy efficiency of the drive unit 21 at the time when the drive unit 21 generates the driving force Pd is equal to or higher than a predetermined efficiency when the current vehicle speed Vown of the own vehicle 100 is taken into consideration is calculated as the required acceleration Greq. Then, the vehicle driving assistance system 10 calculates the required driving force Pd_req for achieving the required acceleration Greq, and accelerates the own vehicle 100 by controlling operation of the drive unit 21 so that the required driving force Pd_req is generated from the drive unit 21.

Then, the CPU proceeds to step 895 of FIG. 8, via step 1095 and step 995 of FIG. 9, and once finishes this routine.

On the other hand, when a negative decision (NO) is obtained in step 1015, the CPU proceeds to step 895 of FIG. 8, via step 1095 and step 995 of FIG. 9, and once finishes this routine.

Also, when a negative decision (NO) is obtained in step 905 of FIG. 9, the CPU proceeds to step 915, to determine whether the front inter-vehicle distance Dfr is longer than the predetermined front middle distance Dfr_mid.

Figure 11:
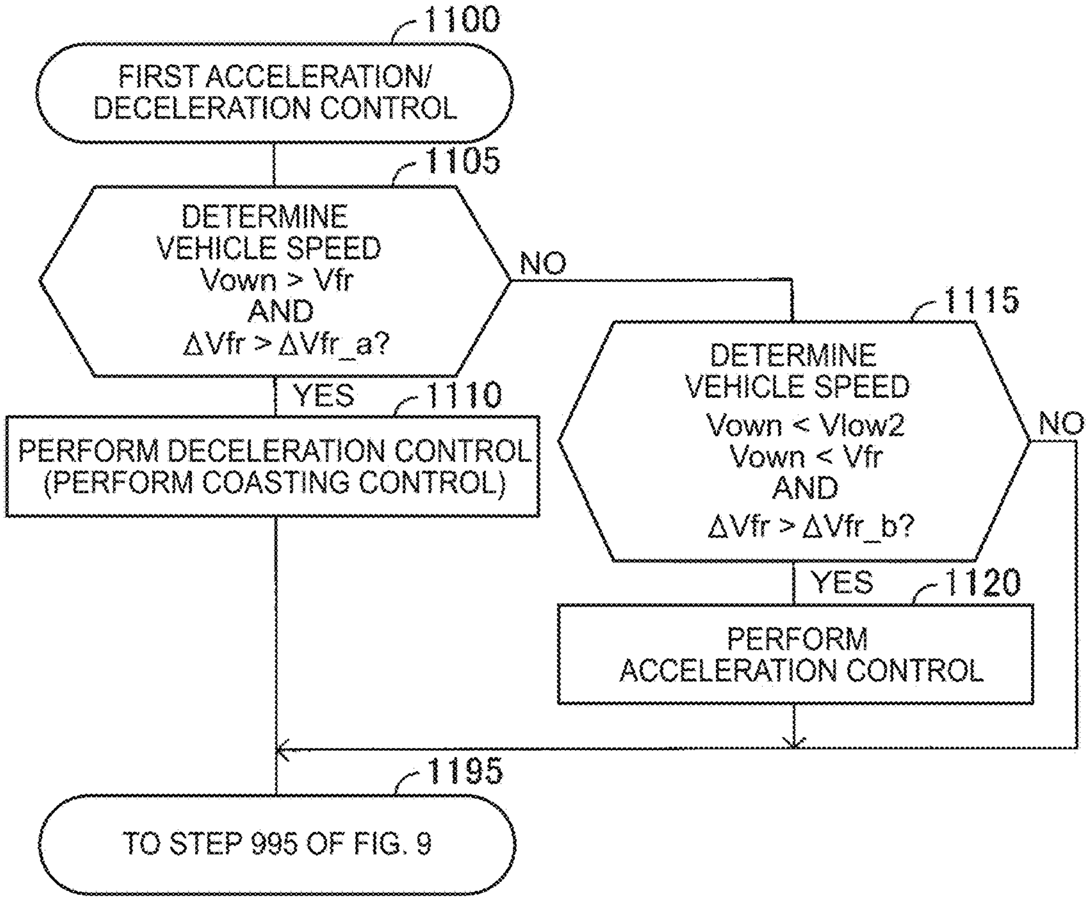
FIG. 11 is a flowchart illustrating a routine executed by the vehicle driving assistance system according to the embodiment of the present disclosure.

When an affirmative decision (YES) is obtained in step 915, the CPU proceeds to step 920, to execute a routine shown in FIG. 11 so as to perform the first acceleration/deceleration control. When proceeding to step 920, the CPU starts processing from step 1100 of FIG. 11, and proceeds to step 1105, to determine whether the vehicle speed Vown of the own vehicle 100 is faster than the vehicle speed Vfr of the forward vehicle 200*fr*, and the difference ΔVfr between these vehicle speeds is larger than the predetermined front approaching vehicle speed difference ΔVfr_a.

When an affirmative decision (YES) is obtained in step 1105, the CPU proceeds to step 1110, to perform the deceleration control so as to decelerate the own vehicle 100.

Then, the CPU proceeds to step 895 of FIG. 8, via step 1195 and step 995 of FIG. 9, and once finishes this routine.

On the other hand, when a negative decision (NO) is obtained in step 1105, the CPU proceeds to step 1115, to determine whether the vehicle speed Vown of the own vehicle 100 is lower than the lower limit Vlow2 of the second vehicle-speed range R2, and whether the vehicle speed Vown of the own vehicle 100 is slower than the vehicle speed Vfr of the forward vehicle 200*fr*, and the difference ΔVfr between these vehicle speeds is larger than the predetermined front separating vehicle speed difference ΔVfr_b.

When an affirmative decision (YES) is obtained in step 1115, the CPU proceeds to step 1120, to perform the acceleration control and accelerate the own vehicle 100.

Then, the CPU proceeds to step 895 of FIG. 8, via step 1195 and step 995 of FIG. 9, and once finishes this routine.

On the other hand, when a negative decision (NO) is obtained in step 1115, the CPU proceeds to step 895 of FIG. 8, via step 1195 and step 995 of FIG. 9, and once finishes this routine.

Figure 12:
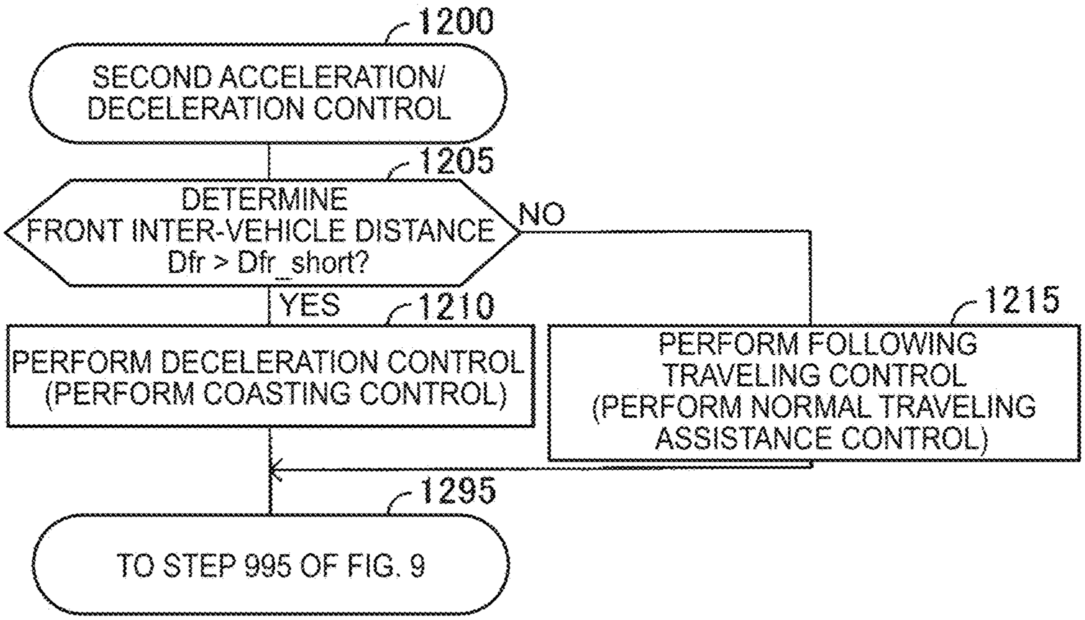
FIG. 12 is a flowchart illustrating a routine executed by the vehicle driving assistance system according to the embodiment of the present disclosure.

Also, when a negative decision (No) is obtained in step 915 of FIG. 9, the CPU proceeds to step 925, to execute a routine shown in FIG. 12 so as to perform the second acceleration/deceleration control. Thus, when proceeding to step 925, the CPU starts processing from step 1200 of FIG. 12, and proceeds to step 1205, to determine whether the front inter-vehicle distance Dfr is longer than the predetermined front short distance Dfr_short.

When an affirmative decision (YES) is obtained in step 1205, the CPU proceeds to step 1210, to perform the deceleration control so as to decelerate the own vehicle 100.

Then, the CPU proceeds to step 895 of FIG. 8, via step 1295 and step 995 of FIG. 9, and once finishes this routine.

On the other hand, when a negative decision (NO) is obtained in step 1205, the CPU proceeds to step 1215, to perform the following traveling control.

Then, the CPU proceeds to step 895 of FIG. 8, via step 1295 and step 995 of FIG. 9, and once finishes this routine.

When a negative decision (NO) is obtained in step 815 of FIG. 8, the CPU proceeds to step 825, to determine whether the front inter-vehicle distance Dfr is longer than the predetermined forward vehicle determination distance Dfr_th.

Figure 13:
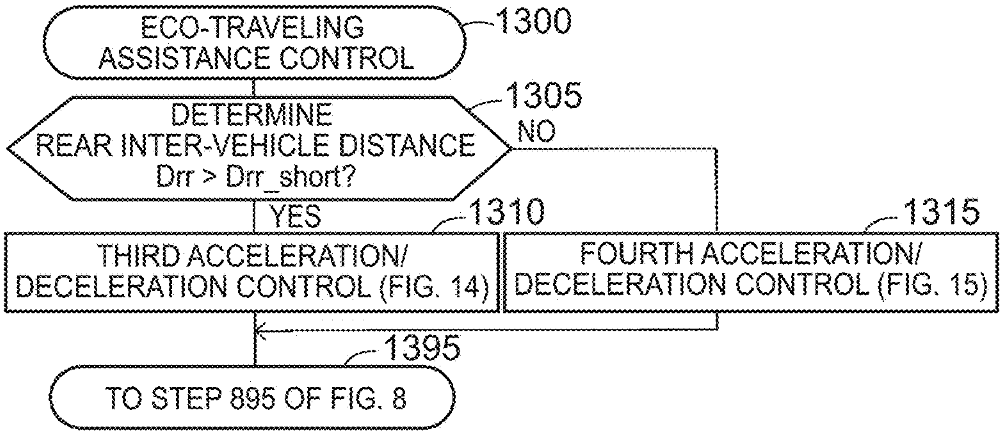
FIG. 13 is a flowchart illustrating a routine executed by the vehicle driving assistance system according to the embodiment of the present disclosure.

When an affirmative decision (YES) is obtained in step 825, the CPU proceeds to step 830, to execute a routine shown in FIG. 13 so as to perform the eco-traveling assistance control. Thus, when proceeding to step 830, the CPU starts processing from step 1300 of FIG. 13, and proceeds to step 1305, to determine whether the rear inter-vehicle distance Drr is longer than the predetermined rear short distance Drr_short.

Figure 14:
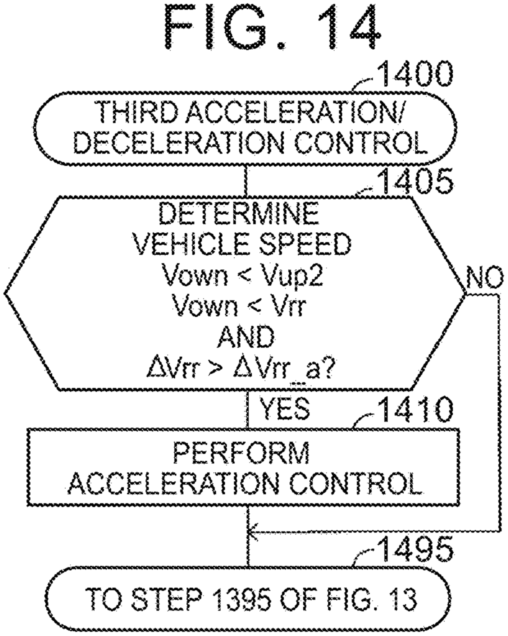
FIG. 14 is a flowchart illustrating a routine executed by the vehicle driving assistance system according to the embodiment of the present disclosure.

When an affirmative decision (YES) is obtained in step 1305, the CPU proceeds to step 1310, to execute a routine shown in FIG. 14 so as to perform the third acceleration/deceleration control. Thus, when proceeding to step 1310, the CPU starts processing from step 1400 of FIG. 14, and proceeds to step 1405, to determine whether the vehicle speed Vown of the own vehicle 100 is lower than the upper limit Vup2 of the second vehicle-speed range R2, and whether the vehicle speed Vown of the own vehicle 100 is slower than the vehicle speed Vrr of the following vehicle 200*rr*, and the difference ΔVrr between these vehicle speeds is larger than the predetermined rear approaching vehicle speed difference ΔVrr_a.

When an affirmative decision (YES) is obtained in step 1405, the CPU proceeds to step 1410, to perform the acceleration control and accelerate the own vehicle 100.

Then, the CPU proceeds to step 895 of FIG. 8, via step 1495 and step 1395 of FIG. 13, and once finishes this routine.

On the other hand, when a negative decision (NO) is obtained in step 1405, the CPU proceeds to step 895 of FIG. 8, via step 1495 and step 1395 of FIG. 13, and once finishes this routine.

Figure 15:
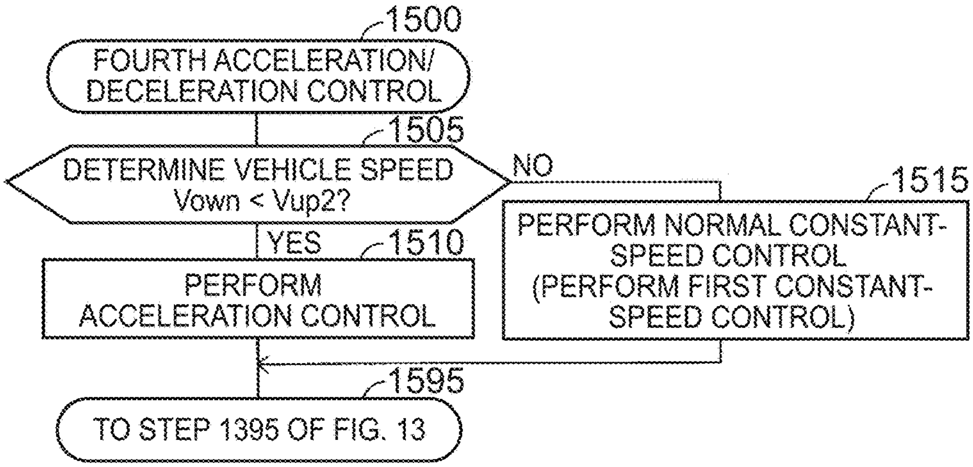
FIG. 15 is a flowchart illustrating a routine executed by the vehicle driving assistance system according to the embodiment of the present disclosure.

When a negative decision (NO) is obtained in step 1305, the CPU proceeds to step 1315, to execute a routine shown in FIG. 15 so as to perform the fourth acceleration/deceleration control. Thus, when proceeding to step 1315, the CPU starts processing from step 1500 of FIG. 15, and proceeds to step 1505, to determine whether the vehicle speed Vown of the own vehicle 100 is lower than the upper limit Vup2 of the second vehicle-speed range R2.

When an affirmative decision (YES) is obtained in step 1505, the CPU proceeds to step 1510, to perform the acceleration control and accelerate the own vehicle 100.

Then, the CPU proceeds to step 895 of FIG. 8, via step 1595 and step 1395 of FIG. 13, and once finishes this routine.

On the other hand, when a negative decision (NO) is obtained in step 1505, the CPU proceeds to step 1515, and performs the normal constant-speed control (the first constant-speed control).

Then, the CPU proceeds to step 895 of FIG. 8, via step 1595 and step 1395 of FIG. 13, and once finishes this routine.

When a negative decision (NO) is obtained in step 825 of FIG. 8, the CPU proceeds to step 835, to perform the following traveling control.

Then, the CPU proceeds to step 895, and once finishes this routine.

Figure 16:
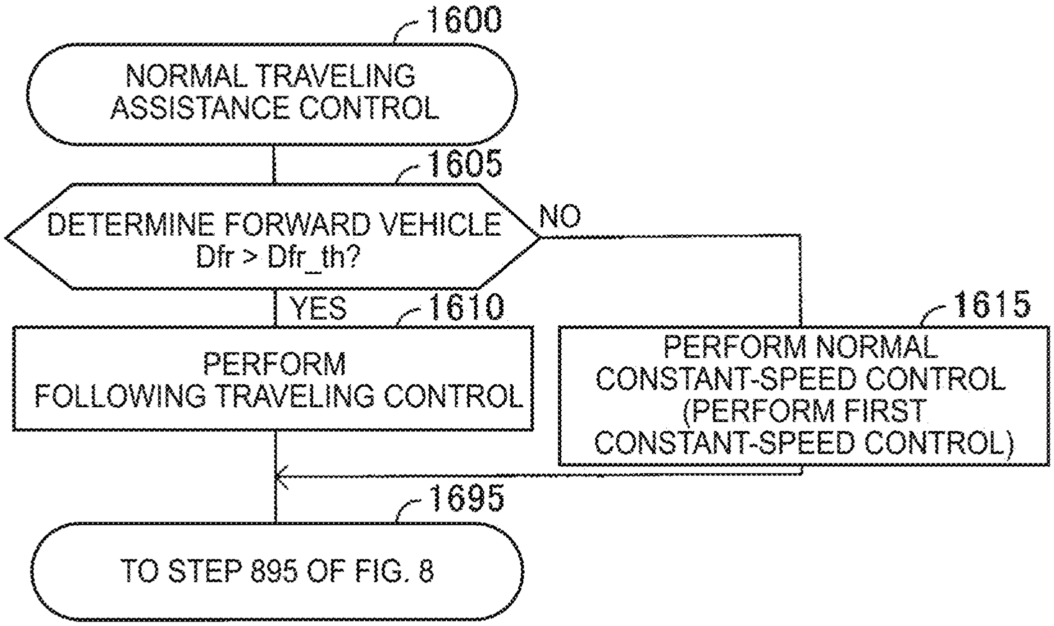
FIG. 16 is a flowchart illustrating a routine executed by the vehicle driving assistance system according to the embodiment of the present disclosure.

When a negative decision (NO) is obtained in step 810, the CPU proceeds to step 840, to execute a routine shown in FIG. 16 so as to perform the normal traveling assistance control. Thus, when proceeding to step 840, the CPU starts processing from step 1600 of FIG. 16, and proceeds to step 1605, to determine whether the front inter-vehicle distance Dfr is longer than the predetermined forward vehicle determination distance Dfr_th.

When an affirmative decision (YES) is obtained in step 1605, the CPU proceeds to step 1610, to perform the following traveling control.

Then, the CPU proceeds to step 895 of FIG. 8 via step 1695, and once finishes this routine.

On the other hand, when a negative decision (NO) is obtained in step 1605, the CPU proceeds to step 1615, to perform the normal constant-speed control (the first constant-speed control).

Then, the CPU proceeds to step 895 of FIG. 8 via step 1695, and once finishes this routine.

When a negative decision (NO) is obtained in step 805 of FIG. 8, the CPU proceeds to step 895, and once finishes this routine.

The specific operation of the vehicle driving assistance system 10 has been described above.

An applicable embodiment of the present disclosure is not limited to the above embodiment, but various modified examples may be employed within the scope of the present disclosure.

In the case where there is a forward vehicle 200*fr* but there is no following vehicle 200*rr* when the eco-traveling assistance control is executed, the vehicle driving assistance system 10 performs the first acceleration/deceleration control or the second acceleration/deceleration control, depending on whether the front inter-vehicle distance Dfr is longer than the predetermined front middle distance Dfr_mid. However, the vehicle driving assistance system 10 may be configured to perform the first acceleration/deceleration control or the second acceleration/deceleration control, irrespective of whether the front inter-vehicle distance Dfr is longer than the predetermined front middle distance Dfr_mid, in the case where there is a forward vehicle 200*fr* but there is no following vehicle 200*rr* when the eco-traveling assistance control is executed.

Also, in the case where there is no forward vehicle 200*fr* but there is a following vehicle 200*rr* when the eco-traveling assistance control is executed, the vehicle driving assistance system 10 performs the third acceleration/deceleration control or the fourth acceleration/deceleration control, depending on whether the rear inter-vehicle distance Drr is longer than the predetermined rear short distance Drr_short. However, the vehicle driving assistance system 10 may be configured to perform the third acceleration/deceleration control or the fourth acceleration/deceleration control, irrespective of whether the rear inter-vehicle distance Drr is longer than the predetermined rear short distance Drr_short, in the case where there is no forward vehicle 200*fr* but there is a following vehicle 200*rr* when the eco-traveling assistance control is executed.

What is claimed is:

1. A vehicle driving assistance system comprising:

a controller that performs traveling assistance control for automatically controlling an acceleration of an own vehicle to cause the own vehicle to travel automatically; and one or more sensors configured to detect a forward vehicle that travels on a same lane as the own vehicle within a predetermined forward vehicle determination distance ahead of the own vehicle, wherein:

the traveling assistance control includes first constant-speed control, following traveling control, and second constant-speed control, in the first constant-speed control, the acceleration of the own vehicle is automatically controlled, based on a first vehicle-speed range including a set vehicle speed, such that a vehicle speed of the own vehicle is kept substantially equal to the set vehicle speed, and in the second constant-speed control, the acceleration of the own vehicle is automatically controlled, based on a second vehicle-speed range including the set vehicle speed, such that the vehicle speed of the own vehicle is kept substantially equal to the set vehicle speed;

each of the first vehicle-speed range and the second vehicle-speed range are both ranges in which vehicle speed variations from the set vehicle speed are allowed;

the second vehicle-speed range is set to a range that is wider than the first vehicle-speed range; and the controller is configured to:

in a case where the execution of the second constant-speed control is requested, perform deceleration control for reducing the vehicle speed of the own vehicle or acceleration control for increasing the vehicle speed of the own vehicle, based on a comparison between the vehicle speed of the own vehicle and the vehicle speed of the forward vehicle, and in a case where the execution of the second constant-speed control is not requested, perform the first constant speed control when no preceding vehicle is present, and perform the following driving control when a preceding vehicle is present.

2. The vehicle driving assistance system according to claim 1, wherein the controller is configured to perform the deceleration control in a case where the execution of the second constant-speed control is requested and the vehicle speed of the own vehicle is faster than the vehicle speed of the forward vehicle.

3. The vehicle driving assistance system according to claim 1, wherein the controller is configured to perform the deceleration control in a case where the execution of the second constant-speed control is requested, the vehicle speed of the own vehicle is faster than the vehicle speed of the forward vehicle, and a difference between the vehicle speed of the own vehicle and the vehicle speed of the forward vehicle is larger than a predetermined forward approaching vehicle speed difference.

4. The vehicle driving assistance system according to claim 1, wherein the controller is configured to perform the acceleration control in a case where the execution of the second constant-speed control is requested and the vehicle speed of the own vehicle is lower than the vehicle speed of the forward vehicle.

5. The vehicle driving assistance system according to claim 1, wherein the controller is configured to perform the acceleration control in a case where the execution of the second constant-speed control is requested, the vehicle speed of the own vehicle is faster than the vehicle speed of the forward vehicle, and the vehicle speed of the own vehicle is lower than a lower limit of the second vehicle-speed range.

6. The vehicle driving assistance system according to claim 1, wherein the controller is configured to perform the acceleration control in a case where the execution of the second constant-speed control is requested, the vehicle speed of the own vehicle is lower than the vehicle speed of the forward vehicle, and a difference between the vehicle speed of the own vehicle and the vehicle speed of the forward vehicle is larger than a predetermined forward approaching vehicle speed difference.

7. The vehicle driving assistance system according to claim 1, wherein when a front inter-vehicle distance is longer than a predetermined front middle distance, perform deceleration control or acceleration control based on a comparison of the vehicle speed of the own vehicle and the vehicle speed of the preceding vehicle.

8. The vehicle driving assistance system according to claim 1, wherein when a front inter-vehicle distance is shorter than or equal to a predetermined front middle distance, perform deceleration control based on the front inter-vehicle distance being longer than a predetermined front short distance, and perform the following traveling control based on the front inter-vehicle distance is shorter than the predetermined front short distance.

9. A vehicle driving assistance system comprising:

a controller that performs traveling assistance control for automatically controlling an acceleration of an own vehicle to cause the own vehicle to travel automatically; and one or more sensors configured to detect a forward vehicle that travels on a same lane as the own vehicle within a predetermined forward vehicle determination distance ahead of the own vehicle, wherein:

the driving assistance control includes first driving assistance control and second driving assistance control, the first driving assistance control includes at least a first constant-speed control and a following traveling control, and the second driving support control includes at least a second constant-speed control, a deceleration control for reducing the vehicle speed of the own vehicle, and an acceleration control for increasing the vehicle speed of the host vehicle, in the first constant-speed control, the acceleration of the own vehicle is automatically controlled, based on a first vehicle-speed range including a set vehicle speed, such that a vehicle speed of the own vehicle is kept substantially equal to the set vehicle speed, and in the second constant-speed control, the acceleration of the own vehicle is automatically controlled, based on a second vehicle-speed range including the set vehicle speed, such that the vehicle speed of the own vehicle is kept substantially equal to the set vehicle speed;

each of the first vehicle-speed range and the second vehicle-speed range are both ranges in which vehicle speed variations from the set vehicle speed are allowed;

the second vehicle-speed range is set to a range that is wider than the first vehicle-speed range; and the controller is configured to:

in a case where the execution of the second driving assistance control is requested, perform deceleration control or acceleration control based on a comparison between the vehicle speed of the own vehicle and the vehicle speed of the forward vehicle, and in a case where the execution of the second driving assistance control is not requested, perform the first constant speed control when no preceding vehicle being present, and perform the following driving control when a preceding vehicle being present.

* * * * *